US010198267B2

United States Patent
Airaud et al.

(10) Patent No.: US 10,198,267 B2
(45) Date of Patent: Feb. 5, 2019

(54) REGISTER RENAMING USING SNAPSHOT BUFFERS

(71) Applicant: ARM LIMITED, Cambridge (GB)

(72) Inventors: Cedric Denis Robert Airaud, Saint Laurent du Var (FR); Luca Scalabrino, Villeneuve Loubet (FR); Frederic Jean Denis Arsanto, Le Rouret (FR); Thomas Gilles Tarridec, Juan-les-Pins (FR)

(73) Assignee: ARM Limited, Cambridge (GB)

( * ) Notice: Subject to any disclaimer, the term of this patent is extended or adjusted under 35 U.S.C. 154(b) by 320 days.

(21) Appl. No.: 15/088,368

(22) Filed: Apr. 1, 2016

(65) Prior Publication Data

US 2016/0350114 A1  Dec. 1, 2016

(30) Foreign Application Priority Data

May 28, 2015 (GB) ...................................... 1509144

(51) Int. Cl.
*G06F 9/38* (2018.01)
(52) U.S. Cl.
CPC ............ *G06F 9/384* (2013.01); *G06F 9/3838* (2013.01); *G06F 9/3859* (2013.01); *G06F 9/3863* (2013.01)
(58) Field of Classification Search
CPC ...... G06F 9/384; G06F 9/3863; G06F 9/3859; G06F 9/3838
USPC ........................................................ 712/217
See application file for complete search history.

(56) References Cited

U.S. PATENT DOCUMENTS

| | | | | |
|---|---|---|---|---|
| 5,694,564 A | * | 12/1997 | Alsup | G06F 9/3836 711/133 |
| 5,872,950 A | * | 2/1999 | Levitan | G06F 9/3836 712/217 |
| 5,961,636 A | * | 10/1999 | Brooks | G06F 9/3863 712/222 |
| 9,672,044 B2 | * | 6/2017 | Tran | G06F 9/384 |
| 2004/0230778 A1 | * | 11/2004 | Chou | G06F 9/384 712/228 |

(Continued)

FOREIGN PATENT DOCUMENTS

GB  2514436  11/2014

OTHER PUBLICATIONS

Combined Search and Examination Report for GB 1509144.0, dated Nov. 30, 2015, 7 pages.

(Continued)

*Primary Examiner* — Aimee Li
*Assistant Examiner* — Shawn Doman
(74) *Attorney, Agent, or Firm* — Nixon & Vanderhye P.C.

(57) ABSTRACT

An apparatus has register rename circuitry to map architectural register specifiers specified by instructions to physical register specifiers identifying physical registers. A restoration table identifies at least one restoration mapping between an architectural register specifier and a previously mapped physical register specifier. Register reserving circuitry indicates one or more reserved register specifiers. In response to detecting that a speculative instruction corresponding to a restoration mapping has been committed when that instruction or an older instruction still could potentially read a register, the register reserving circuitry indicates the physical register specifier of that restoration mapping as reserved.

10 Claims, 12 Drawing Sheets

(56) References Cited

U.S. PATENT DOCUMENTS

| | | | |
|---|---|---|---|
| 2005/0120191 A1* | 6/2005 | Akkary | G06F 9/3836 |
| | | | 712/217 |
| 2008/0114966 A1 | 5/2008 | Begon et al. | |
| 2010/0153690 A1* | 6/2010 | Vick | G06F 9/30123 |
| | | | 712/217 |
| 2012/0005444 A1* | 1/2012 | Rupley | G06F 9/384 |
| | | | 711/166 |
| 2012/0278596 A1 | 11/2012 | Tran | |
| 2014/0289501 A1* | 9/2014 | Schon | G06F 9/384 |
| | | | 712/217 |

OTHER PUBLICATIONS

Moudgill et al., "Register renaming and dynamic speculation: an alternative approach", IEEE, Dec. 1, 1993, pp. 202-213, Proceedings of the 26 Annual International Symposium on Microarchitecture.

* cited by examiner

REGISTER RENAMING USING SNAPSHOT BUFFERS

This application claims priority to GB Patent Application No. 1509144.0 filed 28 May 2015, the entire content of which is hereby incorporated by reference.

BACKGROUND

Technical Field

The present technique relates to the field of data processing. More particularly, it relates to an apparatus supporting register renaming and a corresponding method.

Technical Background

A data processing apparatus may support register renaming in which architectural register specifiers specified by instructions are mapped to physical register specifiers identifying physical registers to be accessed in response to the instructions.

SUMMARY

At least some examples provide an apparatus comprising:
register rename circuitry to map architectural register specifiers specified by instructions to physical register specifiers identifying physical registers to be accessed in response to the instructions;
a restoration table to identify at least one restoration mapping between an architectural register specifier specified by a corresponding speculative instruction and a physical register specifier previously mapped to that architectural register specifier; and
register reserving circuitry to indicate one or more reserved physical register specifiers which are prevented from being remapped to a different architectural register specifier by the register rename circuitry;
wherein in response to detecting that the speculative instruction corresponding to a restoration mapping of the restoration table has been committed when the speculative instruction or at least one older instruction still has the potential to trigger a read of a physical register, the register reserving circuitry is configured to indicate the physical register specifier specified by that restoration mapping as a reserved physical register specifier.

At least some examples provide an apparatus comprising:
means for mapping architectural register specifiers specified by instructions to physical register specifiers identifying physical registers to be accessed in response to the instructions;
means for identifying at least one restoration mapping between an architectural register specifier specified by a corresponding speculative instruction and a physical register specifier previously mapped to that architectural register specifier; and
means for indicating one or more reserved physical register specifiers which are prevented from being remapped to a different architectural register specifier by the means for mapping;
wherein in response to detecting that the speculative instruction corresponding to a restoration mapping of the means for identifying has been committed when the speculative instruction or at least one older instruction still has the potential to trigger a read of a physical register, the means for indicating is configured to indicate the physical register specifier specified by that restoration mapping as a reserved physical register specifier.

At least some examples provide a method comprising:
mapping architectural register specifiers specified by instructions to physical register specifiers identifying physical registers to be accessed in response to the instructions;
identifying at least one restoration mapping between an architectural register specifier specified by a corresponding speculative instruction and a physical register specifier previously mapped to that architectural register specifier;
indicating one or more reserved physical register specifiers which are prevented from being remapped to a different architectural register specifier by the register rename circuitry; and
in response to detecting that the speculative instruction corresponding to a restoration mapping has been committed when the speculative instruction or at least one older instruction still has the potential to trigger a read of a physical register, indicating the physical register specifier specified by that restoration mapping as a reserved physical register specifier.

The above, and other objects, features and advantages will be apparent from the following detailed description of illustrative embodiments which is to be read in connection with the accompanying drawings.

BRIEF DESCRIPTION OF THE DRAWINGS

Further aspects, features and advantages of the present technique will be apparent from the following description of examples, which is to be read in conjunction with the accompanying drawings, in which.

DESCRIPTION OF EXAMPLES

Figure 1:
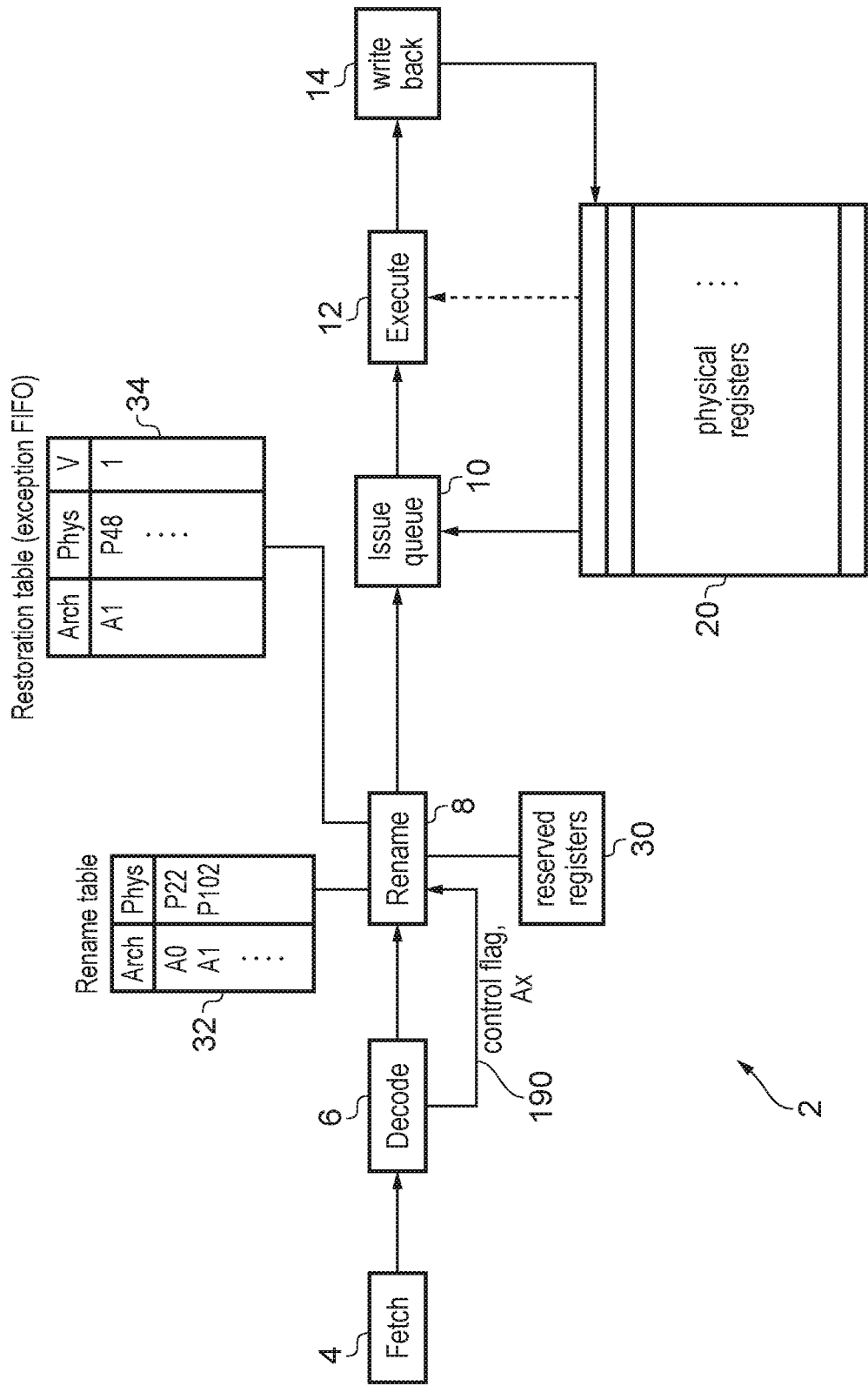
FIG. 1 schematically illustrates an example of an apparatus comprising register rename circuitry.

Some examples of the present technique will now be described below.

A data processing apparatus may have register renaming circuitry for mapping architectural register specifiers specified by instructions to physical registers to be accessed in response to the instructions. While from a programmer's point of view, the instructions may be able to specify a certain number of architectural register specifiers, the apparatus may actually have a larger number of physical registers. Without register renaming two instructions which write to the same architectural register would have to be executed in order to ensure subsequent instructions use the correct value of the architectural register. However, by using register renaming to map the same architectural register to different physical registers for the two instructions, this can allow the two instructions to be executed in parallel or out of order, which can help to improve performance.

Once a physical register has been mapped to an architectural register specifier, it may be desirable to prevent that physical register being remapped to a different architectural register specifier until instructions which require the current mapping of that physical register have accessed the register, and in some cases for a time after this. Hence, available register control circuitry may be provided to control which physical registers are available for mapping to an architectural register specifier by the register renaming circuitry.

The control of which physical registers are available for renaming can be relatively complex. There may be some overhead associated with the control circuitry for monitoring whether certain physical registers are still required or can be made available for remapping to other architectural register specifiers. A more precise approach may be able to track which allocated physical registers are still required with a higher degree of accuracy to enable physical registers to be reclaimed sooner, which can help to improve performance, but this may be at the cost of additional circuit area and greater leakage in implementing the more precise control logic. On the other hand, a less precise technique may be less costly to implement in terms of circuit area and power consumption (leakage), but if it is more conservative in making allocated physical registers available for renaming again, then this may either require a larger pool of physical registers to maintain a given level of performance, or for a given number of registers may limit performance if physical registers cannot be made available soon enough after renaming and there are not enough physical registers to handle a particular set of instructions. Hence, there is a balance to be achieved between performance and energy efficiency.

One factor to consider may be whether there are any instructions outstanding which still need to read a particular physical register, so that a physical register can be protected from reallocation until there are no instructions remaining which need it. One approach may be to decode the register specifiers for all pending instructions in flight which could still trigger a register read, but this can be very expensive in terms of circuit area and power consumption since there may be a large number of in flight instructions and each instruction may specify multiple registers.

The inventors recognised that a more efficient approach may be to exploit a restoration table which may be provided for identifying at least one restoration mapping between an architectural register specifier specified by a corresponding speculative instruction and a physical register specifier previously mapped to that architectural register specifier. For example, in a system supporting speculative execution of instructions, until a speculative instruction is committed it is possible that the result of that instruction may be invalid and so previous architectural register state may need to be restored. Therefore, the restoration table may be provided to identify the physical register specifier which was previously mapped to the architectural register specifier specified by a speculative instruction at the point when the speculative instruction was encountered. If execution of the speculative instruction fails, then the physical register identified in the corresponding entry of the restoration table still contains the previous register state and subsequent instructions can read that register so that they behave as if the speculative instruction was never executed. On the other hand, when a speculative instruction is committed, its result is valid and an it can be deduced that the physical register in the corresponding restoration mapping will not be required by any instruction which is newer than the committed speculative instruction. Therefore, the restoration table can be used to deduce when there cannot be any reads outstanding to a certain register, which avoids the expense of decoding the register references for each pending read.

Hence, when it is detected that a speculative instruction corresponding to a restoration mapping of the restoration table has been committed, and the speculative instruction itself or at least one older instruction still has the potential to trigger a read operation, the register reserving circuitry may indicate that the physical register specifier specified by the restoration register mapping is a reserved physical register specifier. Committing of a speculative instruction can occur before or after the actual execution of the speculative instruction, so at this point the speculative instruction itself or an earlier instruction may still be outstanding. Therefore, while the speculative instruction may no longer require the previous physical register in the restoration table for restoring previous register state, it is possible the physical register may still be read by an outstanding instruction, and so the register reserving circuitry may set an indication of this register as reserved.

An "older instruction" may be an instruction which is earlier in the program order than another instruction. Similarly, a "newer instruction" may be an instruction which is later in the program order than another instruction. The "program order" may be the order in which instructions are fetched from an instruction cache or memory. The apparatus may have processing circuitry which supports out-of-order processing so that the actual execution of instructions may be in a different order to the program order.

The register reserving circuitry may indicate the physical register specifiers specified in the restoration table as reserved physical register specifiers. For example, a status register may be provided for tracking which physical registers are currently indicated in the restoration table. This protects registers which could still be required for state restoration against being remapped to a different architectural register.

The register reserving circuitry may have a storage structure for indicating as reserved the physical registers specified in restoration mappings for committed speculative instructions (which may be separate from the structure tracking the physical registers specified in the restoration table itself). Providing a separate structure for tracking the registers which could still be read but are no longer required for state restoration can be useful because it is not necessary to retain the corresponding entry in the restoration table beyond the committing of the corresponding speculative instruction. Therefore, when a speculative instruction is committed, the corresponding restoration mapping in the restoration table may be invalidated. This can free up space in the restoration table sooner than if the restoration mapping had to be retained until there are no pending reads left, which can make it less likely that the restoration table becomes full and causes a stall in processing.

A speculative instruction may be considered committed when it is determined that that instruction should be executed or that the result of that instruction being executed will be valid. The committing of the speculative instruction may occur either before or after the actual execution of the speculative instruction. Typically whether a speculative instruction is committed may depend on the results of earlier instructions and so once these are available then the speculative instruction can be committed regardless of whether that speculative instruction has been executed or not. If the speculative instruction should not have been executed or the execution of the speculative instruction would generate the incorrect result, then speculative instruction may be cancelled. At this point the restoration mapping in the restoration table may be used to restore a previous register mapping so that the previous register mapping now becomes the current register mapping for the corresponding architectural register specifier. For example the register rename circuitry may maintain a rename table which identifies the current mapping for each architectural register specifier, and when a speculative instruction is cancelled then the register rename circuitry may update the rename table based on the corresponding entry in the restoration table.

The speculative instruction may for example be a branch instruction for which it is not yet known whether the branch should be taken or not, or a conditional instruction for which it is unknown whether the condition on which the instruction is dependent is satisfied. Also the speculative instruction could be a load/store instruction for triggering a load or store operation to a cache or memory, which may be speculative while it is unknown whether the load or store will trigger an abort. Also the speculative instruction could be an instruction which follows another speculative instruction.

The register reserving circuitry may take various forms. In general the register reserving circuitry may have some kind of buffer for indicating which physical registers are reserved because they were specified by a restoration mapping in the restoration table when a corresponding speculative instruction was committed and there was at least one older instruction or the speculative instruction itself which still had the potential to trigger a read of the corresponding physical register. In general this buffer may be cleared of its entries once it is known that there are no more instructions older than the speculative instructions for which the registers were indicated in the buffer which still have the potential to trigger a read. Various techniques may be used to track this, but a particular example will be discussed below.

In one example the register reserving circuitry may include two or more snapshot buffers, each for indicating one or more reserved physical register specifiers for a corresponding window of committed speculative instructions. In response to an indication that the oldest instruction having the potential to trigger a read of the physical register is newer than the window of committed speculative instructions corresponding to one of the snapshot buffers, the register reserving circuitry may clear indications of reserved physical register specifiers in that snapshot buffer, so that the corresponding registers can potentially be made available for renaming again.

Hence, each snapshot buffer tracks the physical register specifiers specified in the restoration mappings for a certain window or group of committed speculative instructions. As instructions are committed, the previous physical register specifiers specified in the corresponding restoration mappings are no longer required for restoring register state for the committed instructions, but there could still be an older instruction pending which still has the potential to trigger a register read to such physical registers, and so indications of these registers as reserved registers may be held in the snapshot buffer until it is detected that the oldest instruction remaining which could still trigger a read is newer than the corresponding window of committed speculative instructions, at which point the registers can be safely made available for renaming (subject to any other conditions which the register reserving circuitry imposes on freeing registers for renaming).

Providing multiple snapshot buffers can improve performance compared to a single snapshot buffer because while one snapshot buffer is waiting for the indication that the oldest instruction remaining is newer than the corresponding window of committed speculative instructions, another snapshot buffer can continue tracking the reserved physical register specifiers for another window of committed speculative instructions. This means it is generally not necessary to stall the pipeline or the restoration table while waiting for the older instructions than the corresponding window of committed speculative instructions to complete.

When multiple snapshot buffers are provided, one of the buffers may be regarded as an active snapshot buffer and any other may be considered to be inactive or "waiting". In some cases there may be three or more snapshot buffers, which can allow for more frequent reclaiming of registers by tracking smaller windows of instructions within each buffer. However, two buffers may be sufficient, in which case one buffer may be active and the other waiting.

For example, in response to detecting that the speculative instruction corresponding to one of the restoration mappings of the restoration table has been committed when the speculative instruction or at least one older instruction still has the potential to trigger a read of a physical register, the register reserving circuitry may update the active snapshot buffer to indicate that the physical register specifier of that restoration mapping is a reserved physical register specifier. Hence, the active snapshot buffer is the buffer which is updated as instructions are committed.

On the other hand, one or more waiting snapshot buffers may record reserved physical register specifiers for one or more previous windows of committed instructions, while waiting for an indication that there is no older instruction which still could read a register. To track this, each waiting snapshot buffer may have an associated snapshot pointer which is indicative of the last committed speculative instruction for which a physical register specifier was indicated as a reserved physical register specifier in the waiting snapshot buffer. In response to a determination that the oldest instruction having the potential to trigger a read to a physical register is newer (later in the fetch program order) than the last committed speculative instruction indicated by the snapshot pointer for a waiting snapshot buffer, the register reserving circuitry may clear the indications of the reserved registers in that waiting snapshot buffer, since it is no longer possible for an outstanding read to access these registers.

When the oldest instruction is newer than the last committed speculative instruction indicated by the pointer for a waiting snapshot buffer, the reserving circuitry may also switch which of the snapshot buffers is active, so that the currently active snapshot buffer becomes waiting and a waiting snapshot buffer becomes active. At this point, the snapshot pointer for the newly waiting snapshot buffer may be set to allow determination of the last instruction for which a register was indicated as reserved in that snapshot buffer.

In this way, the windows of committed instructions tracked by each of the snapshot buffers may be defined in terms of points at which the previously tracked window of committed instructions is "overtaken" by the oldest instruction remaining. By switching which snapshot buffer is active and reclaiming the registers of the waiting buffer each time execution catches up with the points marked by the snapshot pointer for the waiting buffer, this provides a relatively efficient and energy efficient method for tracking which registers should be protected in case there are pending reads, since it is not necessary to decode each pending register reference to determine whether there is a potential read outstanding to a given group of registers. Instead, by using some information about the timings at which instructions are committed and the assumption that registers specified in the restoration table cannot still be required if there are no outstanding instructions which are older than the corresponding instruction which has committed, then the required registers can be tracked with relatively little overhead.

The snapshot pointer need not directly identify the last instruction for which a register was indicated as reserved in the corresponding snapshot buffer. The snapshot pointer could be any information which allows it to be determined when processing has moved beyond the last instruction. For instance, the pointer could actually point to the instruction following the last instruction, so it is known that when that instruction becomes the oldest remaining instruction then processing has moved beyond the last instruction and so registers can be reclaimed.

It should be noted that the detection that a particular speculative instruction has been committed (for the purposes of updating the restoration table and/or the register reserving circuitry) need not necessarily take place at the time that the speculative instruction itself is actually committed. In some cases, detection that an instruction has been committed could happen some time after the instruction has actually been committed. For example in some cases the restoration table may operate as a first in, first out (FIFO) memory in which the entries of the restoration table are removed in age order. In this case, the restoration table may detect whether the speculative instruction corresponding to the oldest entry in the table has been committed and wait for that instruction to be committed before detecting whether a speculative instruction for the next oldest entry has been committed, and by this time the instruction associated with the next oldest entry may already have been committed some time ago.

Also, there may be various ways of detecting whether there are any older instructions pending which could potentially trigger a register read to a physical register indicated in the register reserving circuitry. It is possible to track the actual registers being read by the pending instructions. However this may require more circuitry for decoding register specifiers in the pending instructions.

Therefore a more efficient approach may simply be to assume that there could be an older instruction which has the potential to trigger a read of a physical register if there is at least one older instruction which has not yet progressed beyond a certain stage of processing at which register reads take place, regardless of which registers are specified by the older instruction(s). This can reduce the circuit area and power consumption overhead by eliminating the need to actually detect the particular register specifiers in the instructions. While this may result in a slightly more conservative approach to freeing registers for renaming (it is possible that although there is an older instruction remaining, it does not actually need to access one of the reserved registers being held until the older instruction completes), the overall system may be more efficient by reducing the circuit area and power overhead of tracking registers to be read.

For example there could be a certain unit of a processing pipeline which is responsible for reading values from physical registers in response to instructions. For example in some implementations instructions may trigger reads of registers when the instructions are within an issue queue at which instructions are queued awaiting issue for execution. In other implementations the reading of a register may take place within an execute unit for actually executing the instructions. Hence, the register reading unit could be the issue queue or the execute unit for example. It may be determined that there is no older instruction which could potentially result in a read to a physical register if there is no pending instruction in the register reading unit which is older than the speculative instruction.

For example, the register reading unit may provide an indication of the oldest instruction which is pending in the register reading unit, and the register reserving circuitry may determine whether the oldest instruction having the potential to trigger a read to the physical register is newer than the last committed speculative instruction associated with a particular snapshot buffer based on a comparison of the oldest instruction indication from the register reading unit and the snapshot pointer associated with the snapshot buffer. For example, each instruction within the register reading unit may be associated with a corresponding identifier indicating the age of the instruction, such as the instruction address or some other identifier. This can be used by the register reading unit to generate the oldest instruction indication and this may be combined with the snapshot pointer to determine when processing has progressed beyond the point corresponding to the committed speculative instructions for which registers were indicated in the snapshot buffer.

In some cases the snapshot pointer and the oldest instruction indication may be determined based on pointers associated with the restoration table itself. For example, each entry in a restoration table may have a corresponding address or identifier and the updating of the restoration table may be based on various pointers associated with the restoration table. For example, a write pointer may be provided to indicate the location at which the next entry is to be written to the restoration table when a new restoration mapping is added to the restoration table, and a commit pointer may be provided to indicate the location corresponding to the last committed instruction or the oldest speculative instruction which is not yet resolved or committed. These pointers may be used to derive the snapshot pointer associated with the snapshot buffers.

For example, at the point when the active and waiting snapshot buffers are switched, the snapshot pointer for the buffer which has just been made waiting can be set based on the commit pointer for the restoration table which may indicate the last committed instruction or the next instruction to be committed.

Similarly, the instructions in the register reading unit may be associated with age indicators which may be derived from the write pointer of the restoration table at the time when the instruction was renamed, to allow for a direct comparison between the age of an individual instruction pending in the register reading unit and the point of the restoration table which corresponds to that instruction. These indications can then be used to provide an indication of the oldest instruction pending in the register reading unit, which is directly comparable with the snapshot pointer associated with a snapshot buffer in order to provide an indication of when processing has moved beyond the point at which the registers indicating the snapshot buffer still need to be reserved.

There may be other reasons why physical registers may be reserved, in addition to protecting registers which may be required for potential read operations. For example, the physical registers which are currently allocated in the rename table for corresponding architectural register specifiers, or registers which are still to be subject to a pending write operation, may be protected by the register reserving circuitry. Hence, even if the snapshot buffers do not indicate that a particular register should be reserved, this does not necessarily mean that that register is definitely available for renaming. Hence the technique described above may operate in conjunction with other register reserving techniques if desired.

The term instruction in the present application may also refer to micro-operations. In some cases a complex program instruction fetched from memory may be decoded into multiple micro-operations and so the "instructions" seen by later stages of the pipeline may be micro-operations which are in a different form to the originally fetched instructions. For example this can be useful for improving code density in memory so that it is not necessary to specify separate instructions for each of a similar set of operations but these can instead be generated internally by the decoding circuitry. Therefore, references to "instructions" above should be interpreted as encompassing micro-operations.

It is possible for a fetched instruction to specify a given architectural register specifier as both a source register (a register from which a value is read in response to the instruction) and a destination register (a register to which a value is written in response to the instruction). The decoding circuitry may map this instruction to multiple micro-operations. In this case, there may be a risk that one of the micro-operations uses the given architectural register specifier as a destination register and then a subsequent micro-operation of the same complex instruction uses that architectural register specifier as a source register. This could lead to the value stored in the physical register mapped to the architectural register specifier changing part way through the sequence of micro-operations, so that subsequent micro-operations may use a different source value to earlier micro-operations. This may be undesirable since from the programmer's point of view it would often be desirable to have each of the micro-operations assuming a consistent view of the source registers.

One approach may be to prevent programmers specifying the destination register as one of the source registers, but sometimes this may be useful. For example, using the previous value stored in the destination register as one of the source registers could eliminate the need for an additional instruction to move the value in the destination register to a different register temporarily. Therefore, it may be preferable to support instructions which specify the same register as both a source register and destination register.

Another approach may be for the decoding circuitry to detect when the source and destination registers are the same, and if so, insert an extra micro-operation to temporarily copy the value in the destination register to a different location so that it can still be accessed even after a micro-operation has written to the destination register. However, inserting an extra micro-operation may reduce processing performance since it may delay other operations, especially if dependencies cause the extra micro-operation to be delayed.

The inventors realised that in systems supporting register renaming, this problem can be addressed using the register rename circuitry because the previous value associated with a given architectural register may be retained in the physical register file even after the architectural register has been remapped to a different physical register and updated, and so there is no need to actually move the previous value to a different location. In response to an instruction specifying a selected architectural register specifier as both the source and destination register for which the decoding circuitry generates multiple micro-operations, the register rename circuitry may store to a storage element an indication of a physical register which was previously mapped to the selected architectural register specifier. In response to one of the micro-operations for which the selected architectural register specifier is the source register, and which follows one of the micro-operations for which the selected architectural register specifier is the destination register, the register rename circuitry can map the selected architectural register specifier to the physical register which is indicated in the storage element. This enables later micro-operations to continue accessing the previous value of the selected architectural register as a source register, without requiring an additional micro-operation to transfer the data value to a different register.

In some cases the register rename circuitry may itself be able to detect when there is an instruction specifying the same architectural register as its source and destination. However, in some systems the register rename circuitry may simply receive individual micro-operations from the decoding circuitry and no may not have a global view of the corresponding program instruction from which those micro-operations were generated. Therefore, the decoding circuitry may provide a control indication to the register rename circuitry when it detects that an instruction, which is to be mapped to multiple micro-operations, specifies the same architectural register specifier as both the source and destination register. The decoding circuitry may also provide an indication of which architectural register specifier is used as both a source register and a destination register. In response to this control indication, the register rename circuitry may store to the storage element the indication of the physical register previously mapped to the selected architectural register specifier so that this can be referred to within the corresponding micro-operations.

The storage element which stores the physical register previously mapped to the selected architectural register specifier may be a dedicated storage element for retaining the previous register mapping, or a general storage element such as a register shared with other information, for example.

It is also possible for the storage element to be part of the rename table for storing current mappings between architectural register specifiers and physical registers, with the mapping of the previous physical register to the selected architectural register specifier being added to the rename table as a temporary entry. The temporary entry may be in addition to any new entry generated for the selected architectural register specifier, so that temporarily the architectural register specifier may have two mappings within the rename table. For example, when encountering the first micro-operation that uses the selected architectural register specifier as a destination register, the register rename circuitry may generate a new mapping between the selected architectural register specifier and a further physical register which is different to the one previously mapped to the same architectural register specifier. Subsequent micro-operations of the same complex instruction may be mapped to the previous physical register stored in the storage element, but the new mapping is still generated for the selected architectural register specifier because subsequent instructions following the complex instruction may need to access the updated value of the selected architectural register specifier.

There could be some time between the rename circuitry storing the temporary indication of the previously mapped physical register in the storage element and the last of the micro-operations for the corresponding instruction completing its register read. As the last of these micro-operations could still require a read to the physical register indicated in the storage element, register reserving circuitry may be provided to indicate this physical register as a reserved physical register which is prevented from being remapped to a different architectural register specifier by the register rename circuitry. Any technique for protecting registers from being reclaimed for renaming and being remapped to a different architectural specifier may be used. However, in some cases the temporary mapping of the previously mapped physical register may be protected using the mechanism discussed above using snapshot buffers. For example, the rename circuitry may control the register reserving circuitry to indicate in the active snapshot buffer that the physical register indicated in the storage element is a reserved physical register. The mechanism discussed above for retaining the reserved register indication until there are no older instructions pending which could read a register may protect the temporary physical register from being released until each of the corresponding micro-operations for the complex instruction have read their physical registers.

In some cases, the rename circuitry may omit saving the previous register mapping to the storage element if the decode circuitry determines that it is only the last of the micro-operations that would use the selected register as the destination register.

In general, this technique may be applied to any instruction which is mapped to multiple micro-operations and which specifies the same architectural register specifier as both a source register and a destination register. One example of this may be a load multiple instruction which specifies a base register and a number of destination registers. In response to the load multiple instruction, processing circuitry may, for each destination register specified, update the destination register with a data value accessed from a location in memory at an address calculated using a base address stored in the base register. Sometimes, the list of destination registers provided may include the base register itself, and in this case the technique discussed above may be used to ensure that the previous value of the base register is retained even after one of the micro-operations updates the base register with a value loaded from memory.

Another example may be a swap instruction which specifies two or more registers for which each of the two or more registers is to be updated with a data value that is stored in another of the registers. Without the technique discussed above, the swapping of data values in N registers would appear to require N+1 micro-operations, since first the data value in one of these registers would need to be moved to a temporary location before each register is updated with the value from another register. However, with the technique discussed above, this additional micro-operation is not required since the register renaming circuitry can preserve the previous value of one of the architectural registers by retaining the previous physical register mapped to the architectural register, even if the corresponding architectural register has been updated in a different physical register.

FIG. 1 schematically illustrates a portion of a processing pipeline in a data processing apparatus 2. The pipeline includes a number of stages including a fetch stage 4, a decode stage 6, a rename stage 8, an issue stage 10, an execute stage 12 and a write back stage 14. Instructions to be processed move from stage to stage, and one instruction may be pending at one stage of the pipeline while another instruction is pending at a different stage. It will be appreciated that this is just one example of a possible pipeline and other examples may have other stages or arrangements. Also, some stages could be in a different order or at least partially in parallel (e.g. the rename stage could operate at least partially in parallel with the decode stage).

The fetch stage 4 fetches program instructions from an instruction cache or memory. The decode stage 6 decodes the fetched instructions to generate decoded instructions which are passed to the rest of the pipeline for processing. For some instructions, a single instruction fetched from memory may be decoded into a single decoded instruction passed down the pipeline. However, for other more complex instructions, a single fetched instruction may be decoded into multiple decoded instructions known as "micro-operations". For example, an instruction for triggering a series of operations to be performed (such as a load multiple instruction) may be decoded into individual micro-operations each corresponding to one of the operations. Therefore, the "instructions" as seen by the later stages 8, 10, 12, 14 of the pipeline may be different from the instructions fetched from memory and the term "instruction" should be interpreted as encompassing a micro-operation.

The apparatus 2 has a number of physical registers 20 available for storing data values. A register renaming stage 8 performs register renaming for the decoded instructions (or micro-operations) to map architectural register specifiers specified by the instructions to physical register specifiers identifying one of the physical registers 20. The instruction set architecture may support a certain number of architectural registers which are visible to the programmer. For example, a 4- or 5-bit register field in the instruction encoding may specify one of 16 or 32 different architectural register specifiers. However, to allow hazards between instructions specifying the same architectural register specifier to be resolved or to permit out of order or parallel processing of instructions, a greater number of physical registers may be provided, and the register rename stage 8 may map the architectural register specifiers in the decoded instructions to corresponding physical registers.

The renamed instructions now specifying physical register specifiers are passed to the issue queue 10 where they are queued while awaiting execution. Instructions remain in the issue queue until their operands are available, at which point the instruction is issued to the execute stage 12 for execution. Instructions may be issued for execution in a different order to the original program order in which they were fetched by the fetch stage 4. For example, while one instruction is stalled because its operands are not yet available, a newer instruction whose operands are available may be issued first.

The execute stage 12 may include various processing units for executing processing operations in response to instructions. For example, the processing units may include an arithmetic/logic unit (ALU) for performing arithmetic or logical operations, a load/store unit to perform load operations for loading a data value from memory and placing it in a physical register or store operations for storing to memory a data value currently stored in a physical register, a vector processing unit for performing vector operations on data values comprising multiple data elements, floating-point circuitry for performing operations on floating-point values, or any other type of processing circuitry. In some cases the execute stage 12 may include a number of parallel execute pipelines for processing different kinds of instructions.

When execution of the instruction is complete in the execute stage 12, the instruction is passed to the write back stage 14, which writes a result of the instruction to a physical register 20.

In the example shown in FIG. 1, for renamed instructions which specify one or more physical registers from which data values are to be read, the reading of the physical register takes place while the instruction is pending in the issue queue 10. However, other embodiments may read the physical registers 20 at the execute stage 12 instead, as shown by the dotted line in FIG. 1.

Register reserving circuitry 30 is provided for controlling which of the physical registers can be selected by the rename stage 8 for mapping to an architectural register specifier. The register reserving circuitry 30 will be described in more detail below but in general the register reserving circuitry 30 may provide the rename stage 8 with an indication of which physical registers are available or unavailable (reserved) for selection. When an instruction which writes to a register is received from the decode stage 6, the rename stage 8 generates a new register mapping for the architectural register specified as the destination register for the instruction. The rename stage 8 selects a physical register which is indicated as available by the register reserving circuitry 30 and updates a rename table 32 to include a rename entry mapping the destination architectural specifier to the selected physical register.

The pipeline 2 supports speculative execution of instructions. Some instructions may be executed speculatively before it is known whether the instruction should be executed, or before it is certain that the result of the instruction will be valid. For example, following a branch instruction, some instructions may be executed speculatively based on a prediction of whether the branch is taken or not taken, before the actual branch outcome is known. When the speculation is correct, speculative execution can improve performance by eliminating a delay which would arise if the instruction was not executed until after it is known that the instruction should have executed or that its result will be valid. However, if the speculation turns out to be incorrect, then execution of the instruction may need to be cancelled and architectural state may need to be restored to the last valid state.

A restoration table (also known as an exception memory or exception FIFO) 34 is provided for tracking previous register state which can be restored in the event of a misspeculation. When a new register mapping is generated by the rename stage 8 for a given architectural register specifier, the previous mapping is written to the restoration table 34. For instance, in the example of FIG. 1, when a new mapping of architectural register A1 to physical register P102 is generated in the rename table 32, the physical register P48 which was previously mapped to architectural register A1 is written to the restoration table 34. The previous physical register P48 continues to store the data value which was associated with architectural register A1 at the point just before execution of the instruction. Hence, if there is a misspeculation for the instruction specifying architectural register A1, then the current mapping for architectural register A1 in the rename table 32 is updated based on the corresponding mapping in the exception memory 34, no that architectural register A1 now maps to physical register P48 again. It is not necessary to transfer data between registers in order to restore the architectural state, since simply updating the register mapping in the rename table 32 is enough to cause subsequent instructions which read architectural register A1 to access the previous data in the restored physical register P48.

Entries may be removed from the restoration table 34 once the corresponding instruction has been resolved. When a speculative instruction is committed (i.e. it is known that the instruction should have executed and the result of the speculative instruction will be valid), then the corresponding entry can be removed from the restoration table 34 since it will no longer be required for restoring mapping in the rename table 32. Similarly, when a speculative instruction is cancelled, then once the rename table 32 has been updated based on the mapping indicated in the corresponding entry in the restoration table 34, then the corresponding entry can be removed. Whether a particular speculative instruction should be committed or cancelled will depend on an outcome of one or more earlier instructions, and this could be resolved either before or after the actual execution of the speculative instruction. The restoration table 34 may be managed as a first in, first out (FIFO) memory so that the entries are removed in the same order that they were allocated to the register. Hence, even if an instruction has already been committed or cancelled, its corresponding entry may not be removed from the restoration table 34 until any earlier instructions have been resolved.

Figure 2:
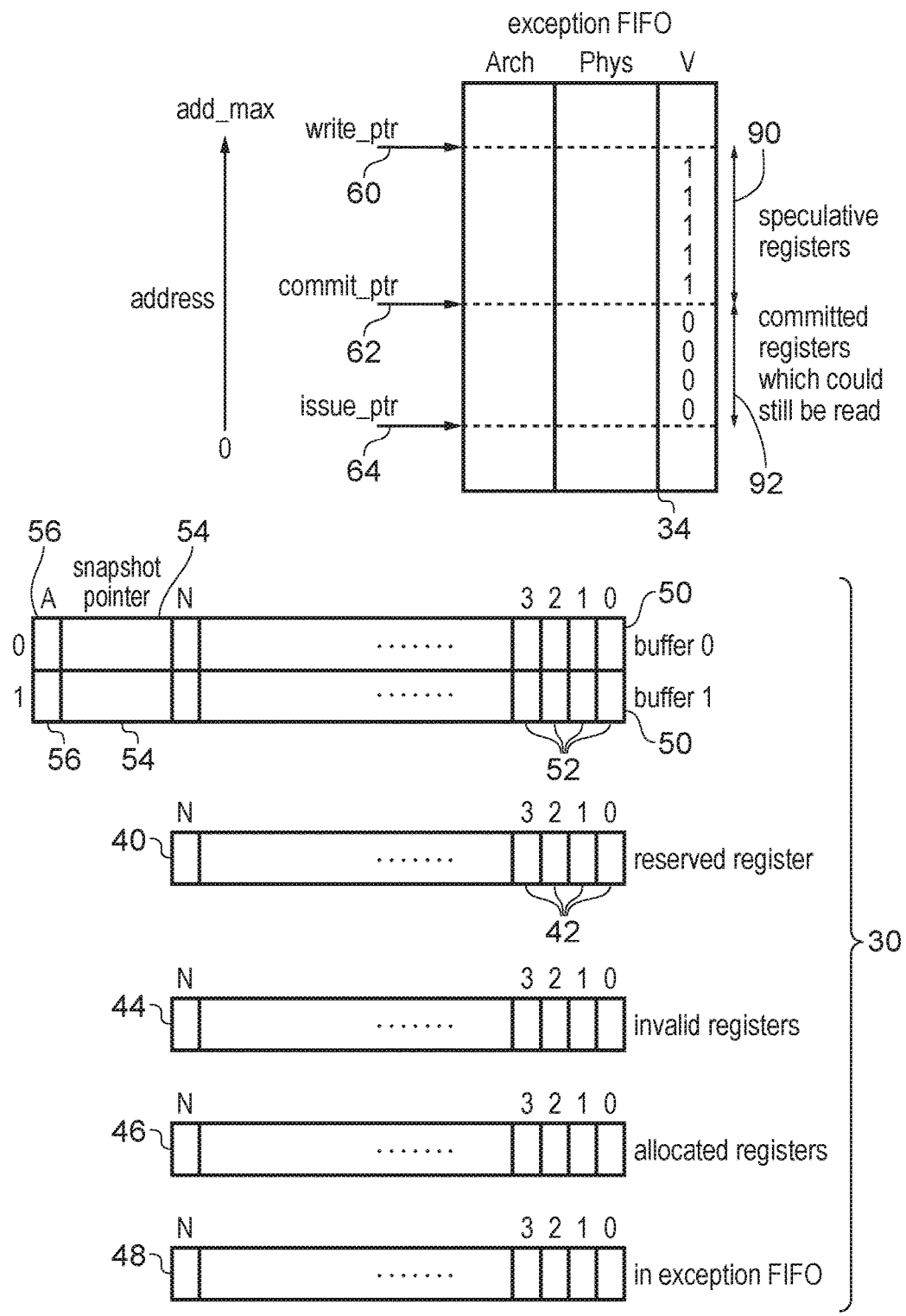
FIG. 2 shows an example of a restoration table for storing restoration mappings between architectural and physical register specifiers and a portion of register reserving circuitry for indicating one or more reserved physical registers specifiers.

FIG. 2 shows a portion of the register reserving circuitry 30 as well as the restoration table 34 (referred to hereafter as an exception FIFO). The reserved register control circuitry 30 includes a reserved register status register 40 which includes a number of bitfields 42, each corresponding to a particular physical register 20. If a bitfield 42 for a particular physical register has a first value (for example, 1) then that register is considered reserved and cannot be selected by the rename stage 8 for mapping to a new architectural register specifier. On the other hand, if the bitfield 42 has a second value (for example, 0) then the register is not reserved and is available for renaming by the rename stage 8. Hence, when generating a new mapping for an architectural specifier specified as the destination register of an instruction, the rename stage 8 selects a physical register for which the corresponding bitfield 42 has the first value and indicates this register in the rename table 32 corresponding to the required architectural register specifier. The rename stage 8 may use various selection algorithms to select a particular register if there are two or more registers available, e.g. a random, least recently used, or round robin algorithm.

The register reserving circuitry 30 controls the bitfields of the reserved register status register 40 in dependence on a number of status registers 44, 46, 48, 50. The status registers include an invalid status register 44, an allocated status register 46, an exception FIFO status register 48 and two snapshot buffers 50. Each of these status registers 44, 46, 48, 50 includes a number of bitfields each corresponding to one of the physical registers 20 and indicating whether that register should be reserved. The reserved register control circuitry 30 permits a reserved indication in the reserved status register 40 to be cleared if none of the corresponding bitfields in the other status registers 44, 46, 48, 50 indicate that the register should be reserved. For example, the register reserving circuitry 30 may include AND or OR gates to combine the indications for a particular physical register 20 from each status register 44, 46, 48, 50, to control whether the corresponding bitfield of the reserved status register 44 can be cleared to indicate that the physical register is available.

The allocated status register 46 indicates which physical registers should be reserved because they are currently allocated to an architectural register specifier in the rename table 32. When the rename stage 8 generates a new register mapping, it sets the bitfield in the allocated status register 46 for the physical register selected for the new register mapping, and clears the bitfield in the allocated status register 46 for a physical register that was previously mapped to the same architectural register specifier. The physical registers currently mapped to architectural register specifiers represent the current architectural state of the processing apparatus 2, and so are protected from renaming using the allocated status register 46, to prevent loss of architectural state.

The exception FIFO status register 48 indicates which physical registers should be reserved because they are currently indicated in the exception FIFO 34. When a restoration mapping is added to the exception FIFO 34, the corresponding physical register is marked as reserved in the exception FIFO status register 48, and when an entry is invalidated in the exception FIFO then the bitfield for the corresponding physical register is cleared in the exception FIFO status register 48. This prevents a physical register being remapped to a different architectural register specifier until after a speculative instruction, which would require the contents of that physical register to be restored in the event of a misspeculation, has been resolved.

The invalid status register 44 is used to track those physical registers 20 for which a pending write is outstanding. When the rename stage 8 generates a new register mapping for the destination register of a particular instruction, it sets the invalid bit for that register in the invalid status register 44. When the write back stage 14 completes a write to a given physical register, then the corresponding bitfield in the invalid register 44 is cleared to indicate that the write is no longer pending. This helps to avoid hazards caused by a write completing in the wrong order relative to other writes or reads.

The snapshot buffers 50 are used to track physical registers which could potentially be subject to a read operation for some pending instructions. These are updated based on the allocation and invalidation of entries within the exception FIFO 34. Again, the snapshot buffers 50 include bitfields 52 for each physical register, which may take a first value if the corresponding register should be reserved because there is a potential read outstanding to that register, and a second value if there is no potential outstanding read to that register. A bit of the reserved register 40 may be cleared only if the corresponding bits in both snapshot buffers 50 are clear (have the second value).

Each snapshot buffer 50 also has an associated snapshot pointer 54 which is used for tracking when the registers indicated in the buffer should be released for renaming, and an active field 56 for indicating whether the snapshot buffer 50 is an active buffer or a waiting buffer. For example an active buffer may have its active field 56 set to 1 and the waiting buffer may have the active field 56 set to 0. The waiting buffer may also be referred to as an inactive buffer.

The exception FIFO 34 is associated with a number of pointers 60, 62, 64 which identify particular entries of the exception FIFO. These pointers may be stored in control registers for example. Each entry of the exception FIFO 34 has a given address and the pointers indicate corresponding addresses within the exception FIFO.

A write pointer 60 indicates the address at which the next entry should be written to the exception FIFO 34. In response to a speculative instruction, the rename stage 8 writes a new entry to the location of the exception FIFO 34 identified by the write pointer 60, specifying the physical register which was previously mapped to the architectural register specified by the speculative instruction. The new exception FIFO entry is marked as valid (e.g. by setting a valid bit V to 1) and the write pointer 60 is incremented to indicate the following entry of the exception FIFO 34 as the next to be written to. If the write pointer 60 was already at the last entry of the exception FIFO 34, incrementing it causes the pointer to jump back to the first ent of the exception FIFO 34, so that the exception FIFO 34 functions as a circular buffer.

A commit pointer 62 indicates the exception FIFO address corresponding to the oldest instruction still to be committed. Indications of which instructions have been committed may be received from the issue queue 10 or the execute stage 12. Some control logic associated with the exception FIFO 34 may determine whether the instruction corresponding to the entry marked by the commit pointer 62 has committed. When it is detected that this instruction has committed then the entry marked by the commit pointer 62 may be invalidated, because the restoration register mapping containing that entry is no longer required since it is now known that the speculative instruction will execute correctly. The commit pointer 62 can then be incremented to mark the following instruction as the next instruction to be committed. If the following instruction has already been committed before the previous instruction, then its entry may be invalidated right away, and the commit pointer moves on to the next entry. Hence, while in general the commit pointer will be incremented one entry at a time, as the instructions may commit out of order then the commit pointer may remain at one entry for a longer time than another, depending on the commit timings. Again, when the commit pointer 62 reaches the last entry of the exception FIFO 34, the following increment resets the commit pointer 62 to the first ent of the exception FIFO 34.

Figure 3:
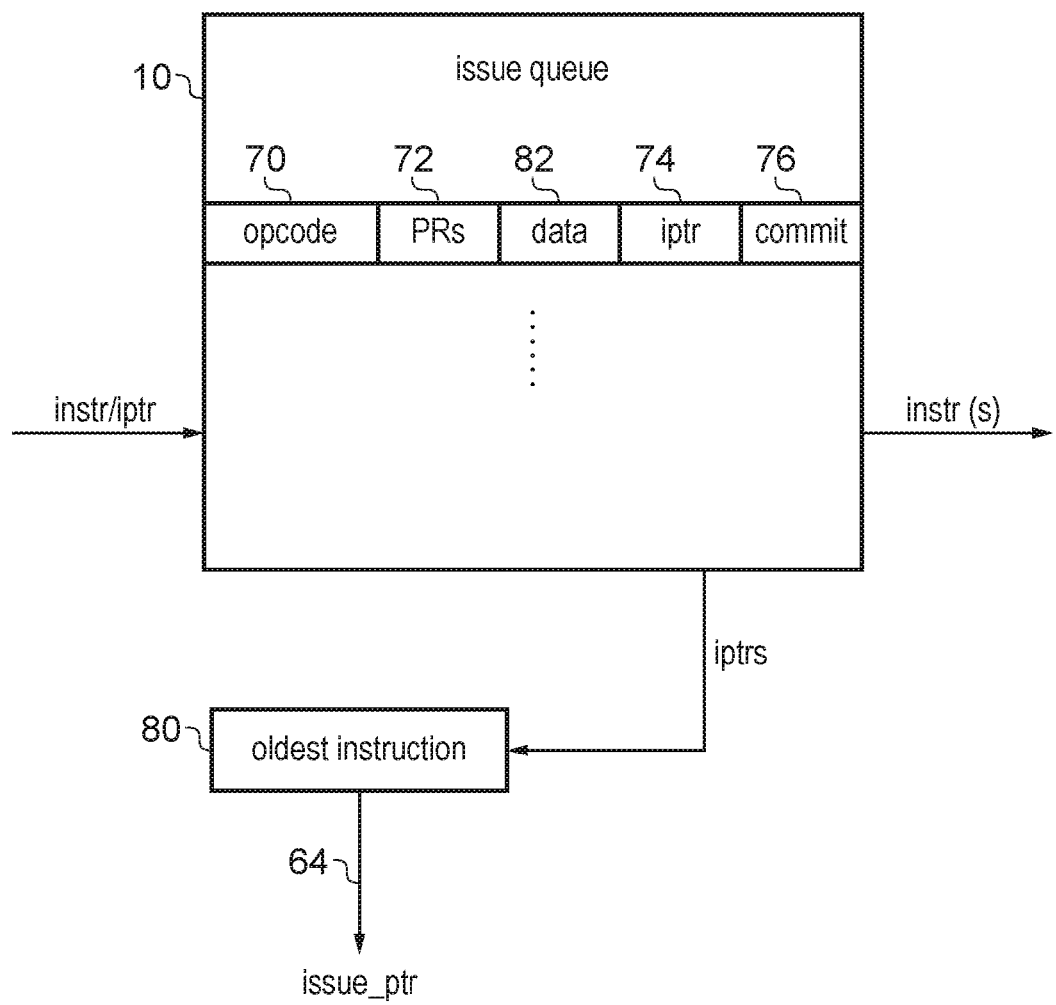
FIG. 3 shows an example of an issue queue which provides an indication of an oldest instruction which still has the potential to trigger a read of a physical register.

An issue pointer 64 indicates the address of an entry which corresponds to the oldest instruction which could potentially read a physical register 20. The issue pointer 64 may be generated by the issue queue 10 as shown in the example of FIG. 3. When the rename stage 8 writes an entry to the exception FIFO 34 for a speculative instruction, the rename stage 8 may capture the current value of the write pointer 60 at this time and indicate this as an instruction pointer which is provided along with the instruction to the issue queue 10. Hence, instructions pending in the issue queue 10 may, in addition to their opcode 70 and physical register specifiers 72 which have been renamed by the rename stage 8, have an associated instruction pointer 74 which is an indicator of the "age" of the instruction. This instruction pointer 74 may be used by the issue queue 10, execute unit 12, exception FIFO control logic, or any other circuit, to determine the correspondence between instructions and the entries of the exception FIFO 34.

Hence, the instruction pointer 74 can be used to determine when to update the commit pointer 62 and issue pointer 64. When an instruction having an instruction pointer 74 equal to the commit pointer 62 is committed (e.g. as indicated by a commit flag 76 in the issue queue 10 or by a signal received from the execute unit 12 or writeback stage 14, depending on when the instruction is committed), the exception FIFO entry 62 indicated by the commit pointer 62 is invalidated, and the commit pointer 62 incremented.

Also, the instruction pointer 74 can be used to determine which instruction is the oldest instruction remaining in the issue queue 10, which is the earliest instruction in the program order. The issue queue may have some associated logic 80 which detects from the instruction pointer 74 of each instruction in the issue queue which instruction is the oldest. Since the exception FIFO 34 acts as a circular buffer, the oldest instruction will not necessarily be the instruction having the lowest value of the instruction pointer 74. When the write pointer 60 reaches the end of the buffer and wraps around to the beginning of the buffer 34, the oldest instruction for a time may be the instruction with the smallest value of the instruction pointer 74 that is greater than the write pointer 60 itself. Once there are no remaining instructions with an instruction pointer 74 greater than the write pointer 60, the oldest instruction is once more the instruction with the lowest instruction pointer 74.

Hence, the control logic 80 detects which instruction is the oldest, and generates the issue pointer 64 based on the instruction pointer 74 of the oldest instruction. The issue pointer 64 is provided to the exception FIFO 34 or to the register reserving circuitry 30 as an indication of the oldest pending instruction which still has the potential to read a register. It should be noted that in this example registers are read when instructions are pending in the issue queue 10, and so the issue queue may store the data 82 which has been read from the register in association with the corresponding instruction. In other examples, data may be read when instructions leave the issue queue 10, in which case the data 82 may not be stored in the issue queue itself.

Hence, referring back to FIG. 2, there is a set of pointers 60, 62, 64 associated with the exception FIFO 34. The write pointer and the commit pointer 60, 62 may typically be incremented one by one as new entries are allocated or invalidated in the exception FIFO 34. However, the issue pointer 64 may jump by several addresses in one go, since if a relatively old instruction gets stuck in the issue queue 10 for a long time while newer instructions are issued ahead of it, then when the older instruction is finally issued the next oldest pending instruction may have an instruction pointer 74 which is several entries further on in the exception FIFO 34, so that the issue pointer 64 does not change in uniform increments.

Also, sometimes instructions may commit before they are issued for execution by the issue queue 10, while at other times instructions may be committed only after they have been issued for execution. Hence, the commit pointer 62 could be either ahead or behind the issue pointer 64, depending on the relative timings of issue and commit for a given instruction. In general, the exception FIFO entries 90 lying behind the write pointer 60 and ahead of the commit pointer 62 correspond to physical registers which should be preserved because the corresponding speculative instructions have not committed yet, and so these registers may still be needed in order to restore previous architectural state. These entries of the exception FIFO 34 are marked as valid, and the corresponding physical registers are indicated in the exception FIFO status register 48 as reserved registers.

When the issue pointer 64 lags behind the commit pointer 62, then the entries 92 lying behind the commit pointer 62 and ahead of the issue pointer 64 are invalid entries corresponding to instructions which have already committed and so the physical registers in these entries will not be required for restoring previous architectural state. However, as the issue pointer 64 is lagging behind, this means there is at least one older instruction pending which could potentially read these physical registers, and so these registers should be protected from renaming.

Therefore, when an entry is invalidated in the exception FIFO 34, then if the commit pointer 62 is ahead of the issue pointer 64 then the physical register indicated in the invalidated entry is marked in the active snapshot buffer 50 as a reserved register. The commit pointer 62 may be considered to be ahead of the issue pointer 64 if either the commit pointer is greater than the issue pointer (the normal case), or the write pointer and the commit pointer are both less than the issue pointer (case when the write pointer and commit pointer have wrapped around the circular buffer but the issue pointer has not yet wrapped around). Each time another entry of the exception FIFO 34 is invalidated, the reserved register circuitry 30 continues to mark the corresponding physical registers as reserved in the active snapshot buffer 50. Hence, the active snapshot buffer 50 will over time be populated with a series of indications of reserved registers which correspond to the physical registers which are no longer required for state restoration for a given window of committed instructions, but which may still be required in case there is an older register read outstanding.

When the waiting snapshot buffer 50 has all the corresponding instructions issued (this is determined when the issue pointer 64 equals or passes the snapshot pointer 54 for that buffer) then all the bitfields 52 of the waiting snapshot buffer 50 are cleared, and provided that none of the corresponding bitfields in one of the other status registers 44, 46, 48 are set, this means that the corresponding bit in the reserved register 40 can also be cleared to make the register available for renaming. Also, at this point the waiting buffer becomes active and the active buffer 50 becomes waiting. Hence, the "window" of instructions monitored by the previously active (now waiting) buffer is closed, and a new "window" is started for the newly active buffer to continue monitoring the registers of another group of committed entries of the exception FIFO 34. The snapshot pointer 54 of the newly waiting buffer 50 is set equal to the current value of the commit pointer 62, to provide an indication of the point at which the corresponding registers can be released. A worked example of this process will be discussed below with respect to FIG. 11. In summary, by alternately using an active buffer to track physical registers which no longer are recorded in the exception FIFO (and so by definition cannot be accessed by any later instruction than the corresponding window of committed instructions), and a waiting buffer 50 to hold on to the reserved register indications until the oldest instruction remaining is newer than the corresponding window of committed instructions (when the issue pointer 64 catches up with the snapshot pointer 54), registers can be reserved in case of potential outstanding register reads and released when no register reads to those registers can be outstanding anymore, without needing to decode all the register specifiers of pending instructions, which saves circuit area and power.

FIGS. 4 to 10 are flow diagrams showing methods for tracking which registers are available for renaming. Each of the methods may be performed substantially in parallel. While the Figures show a number of steps performed in a certain order, it will be appreciated that some of these steps could be performed in parallel or in a different order.

Figure 4:
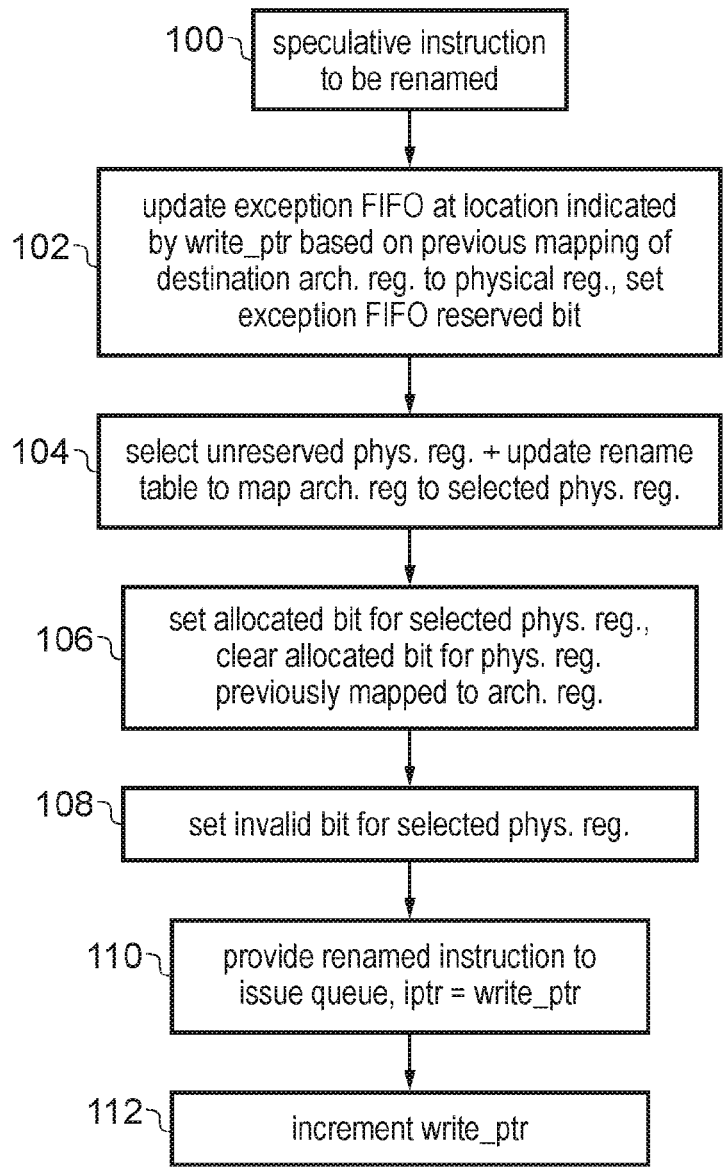
FIG. 4 illustrates a method of performing register renaming.

FIG. 4 shows a method performed by the rename stage 8 to generate register mappings for speculative instructions. At step 100 the rename stage 8 receives a speculative instruction to be renamed. At step 102 the rename stage 8 adds an entry to the exception FIFO 34 at the location marked by the write pointer 60, specifying the destination architectural register specifier specified by the speculative instruction and the physical register which is currently indicated in the rename table 32 as mapped to that architectural register specifier. The rename stage 8 also sets the bitfield of the exception FIFO status register 48 corresponding to the physical register indicated in the new entry of the exception FIFO 34, to indicate that this register is now reserved.

At step 104, the rename stage 8 generates a new register mapping for the destination architectural register specifier of the speculative instruction. The rename stage 8 selects an unreserved physical register whose bitfield 42 in the reserved status register 40 is clear, and updates the rename table 32 so that the entry for the destination architectural register specifier now specifies the selected physical register. At step 106 the rename stage 8 sets the bitfield corresponding to the selected physical register in the allocated status register 46 and clears the bitfield in the allocated status register 46 that corresponds to the physical register previously mapped to the architectural register (which is now specified in the exception FIFO 34). At step 108, the rename stage updates the invalid status register 44 to set the bitfield corresponding to the physical register selected at step 104, to indicate that it is still to be written to.

At step 110, the rename stage 8 provides the renamed instruction to the issue queue 10, now specifying physical register specifiers for its destination register and any source registers rather than architectural register specifiers. For the source registers, existing mappings of the rename table 32 are used to map the architectural register specifiers to physical register specifiers. For the destination register, the new mapping generated at step 104 is used. The instruction is provided to the issue queue along with an instruction pointer 74 which is set equal to the current value of the write pointer 60. At step 112, the write pointer is incremented so that for the following instruction requiring an exception FIFO entry, the entry will be placed in the next location of the exception FIFO. If the write pointer was already at the maximum address then incrementing the write pointer resets the write pointer to the minimum address.

For non-speculative instructions, renaming may take place in the same way as shown in FIG. 4, except that step 102 of updating the exception FIFO and step 112 of incrementing the write pointer can be omitted. Alternatively, all instructions may be allocated an exception FIFO entry and treated in the same way regardless of whether they are speculative or non-speculative, but non-speculative instructions may always be considered to be committed.

Figure 5:
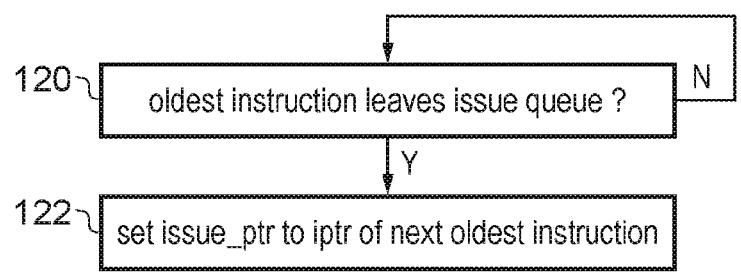
FIG. 5 shows a method of generating an oldest instruction indication.

FIG. 5 shows a method of monitoring which pending instruction in the issue queue is the oldest instruction. At step 120 it is determined whether the oldest instruction currently indicated by the issue pointer 64 has left the issue queue. The oldest instruction may be the instruction having the lowest value of the instruction pointer 74, or if the write pointer 60 is behind the issue pointer 64, the instruction having the lowest value of the instruction pointer 74 that is greater than the write pointer 64. If so then at step 122 the issue pointer 64 is updated to the value of the instruction pointer 74 of the oldest instruction now remaining in the issue queue 10. Alternatively, rather than re-evaluating the issue pointer only when the oldest instruction leaves the issue queue, the issue queue could continually compare the instruction pointers 74 of pending instructions and update the issue pointer 64 accordingly.

Figure 6:
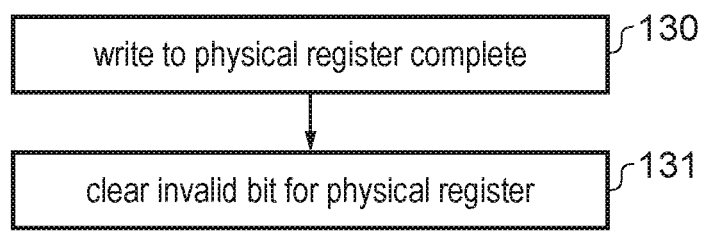
FIG. 6 shows a method of monitoring completion of writes to a physical register.

FIG. 6 shows a method of tracking completed writes. At step 130 the write back stage 40 determines that a write to a given physical register has completed. At step 131 the write back stage 40 controls the register reserving circuitry 30 to clear the invalid bit corresponding to that physical register in the invalid status register 44.

Figure 7:
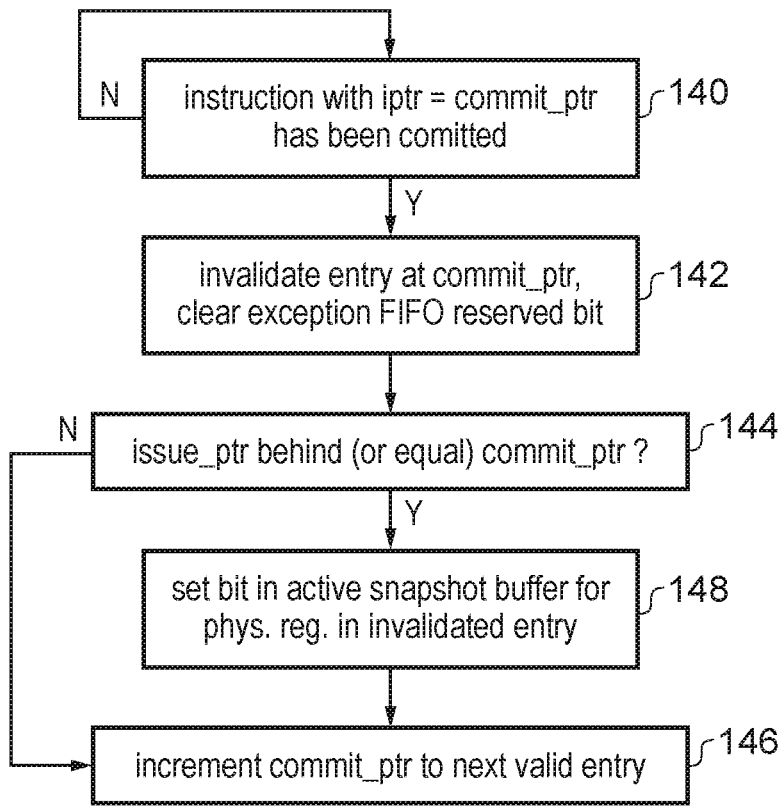
FIG. 7 shows a method performed when a speculative instruction is committed.

FIG. 7 shows a method performed when an instruction is committed. At step 140, it is determined whether the instruction whose instruction pointer 74 matches the current value of the commit pointer 62 has been committed. This can be determined based on indications provided by the issue queue 10 or the execute stage 12 for example. The method waits until the instruction identified by the commit pointer 62 has committed. When the instruction is detected as having been committed, then at step 142 the exception FIFO entry identified by the commit pointer 162 is invalidated, and exception FIFO status register 48 is modified to clear the bit corresponding to the physical register specified in that exception FIFO entry. This reflects that this register is no longer required to be saved for a potential state restoration, since the corresponding instruction has committed.

However, as there may still be an older instruction pending which could potentially read the physical register of the invalidated exception FIFO entry, step 144, and if necessary step 148, are performed. At step 144, it is determined whether the issue pointer 64 is currently equal to, or behind, the commit pointer 62 (i.e. either the issue pointer 64 is equal to the commit pointer 62, the issue pointer 64 has a lower address than the commit pointer 62 or the issue pointer 64 is greater than both the write pointer 60 and the commit pointer 62). If the issue pointer 64 is equal to, or lags behind, the commit pointer 62, then there could be an instruction which is still pending, which could potentially read the physical register that was specified in the recently invalidated exception FIFO. Therefore, at step 148 the active snapshot buffer 50 is updated to set the bit 52 corresponding to the physical register specified in the invalidated entry. At step 146, the commit pointer 62 is incremented to indicate the next valid entry as the next instruction to be committed (if a speculative instruction has been cancelled, there could an intervening invalid entry which is skipped over). On the other hand, if the issue pointer 64 is ahead of the commit pointer 62, then there is no need to protect any registers against potential read operations as all instructions remaining are newer than the committed instruction. In this case, the method proceeds straight to step 146 where the commit pointer 62 is incremented without setting any bits in the active snapshot buffer 50. After incrementing the commit pointer 62 at step 146, the method can return to step 140 to determine whether the instruction corresponding to the next entry of the exception FIFO has been committed. Hence, as several instructions are committed, a set of reserved registers may be accumulated in the active snapshot buffer for a corresponding window of committed instructions.

Figure 8:
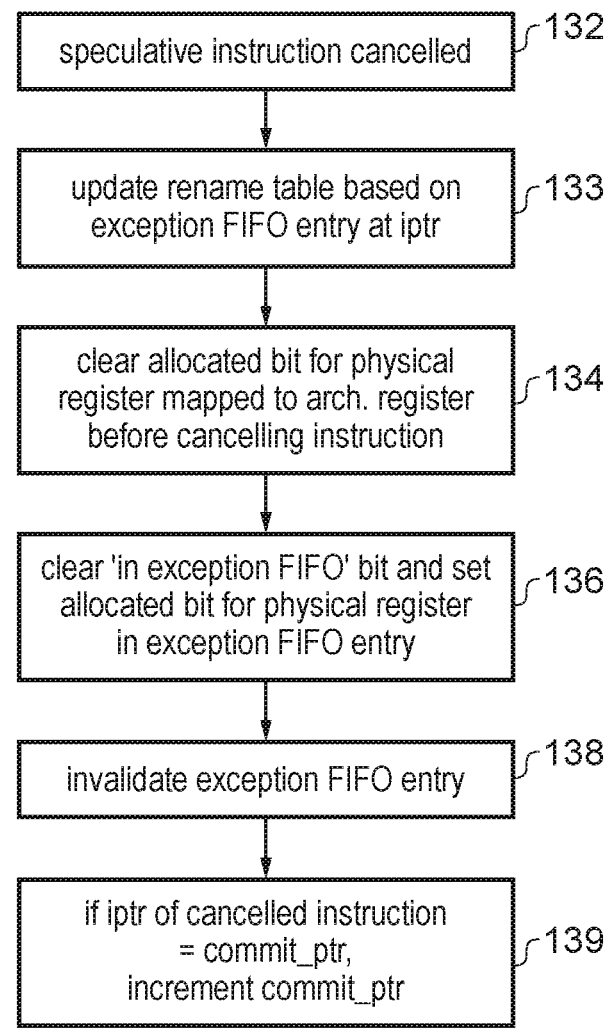
FIG. 8 shows a method performed when a speculative instruction is cancelled.

FIG. 8 shows a method performed when execution of a speculative instruction is cancelled. At step 132 execution of a speculative instruction is cancelled. The cancellation could occur either before or after the instruction has actually been executed, depending on when the conditions required for successful execution of the instruction have been determined not to be satisfied. For example, an instruction may be cancelled if the results of earlier instruction show that the speculative instruction should not be executed at all (e.g.

following a branch misprediction), or because the instruction would be executed with speculative data which turns out to be incorrect. If a speculative instruction is cancelled, then at step 133 the rename stage 8 updates the rename table 32 based on the exception FIFO entry identified by the instruction pointer 74 associated with the cancelled instruction, so that the corresponding architectural register specifier is now once more mapped to the physical register to which it was mapped before the speculative instruction was encountered. Hence, subsequent instructions which refer to the same architectural register will see the old value of that architectural register which has been preserved in the physical register which was previously mapped to that architectural register specifier. Hence, the exception FIFO 34 acts as a restoration table which can be used to restore previous values associated with the architectural registers simply by updating the rename table 32, without actually requiring any transfer of data values between the physical registers 20 themselves. At step 134 the rename stage 8 clears the allocated bit in allocated status register 46 that was associated with the physical register which was mapped to the architectural register before cancelling the speculative instruction, and at step 136 sets the allocated bit for the physical register restored to the rename table 32 based on the exception FIFO. The bit in the exception FIFO status register 48 is also cleared for the physical register now restored to the rename table 32. At step 138, the exception FIFO entry for the cancelled speculative instruction is invalidated (for example by setting a valid bit as 0). At step 139, if the instruction pointer 74 of the cancelled instruction is equal to the commit pointer 62, the commit pointer 62 is incremented to indicate the next valid entry of the exception FIFO 34.

As an example of applying the method of FIG. 8, in the situation shown in FIG. 1, if execution of a speculative instruction corresponding to architectural register A1 is cancelled, then the rename table 32 would be updated based on the exception FIFO 34 so that architectural register A1 is remapped from physical register P102 to physical register P48, the allocated bit for physical register P102 would be cleared, the allocated bit for physical register P48 set, the in exception FIFO" hit for physical register P48 would be cleared, and then the exception FIFO entry providing the restoration mapping of A1 to P48 would be invalidated.

Figure 9:
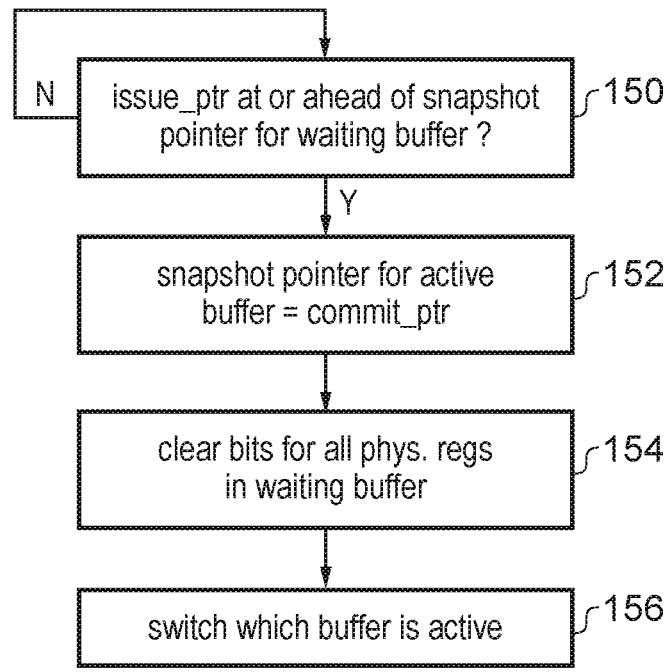
FIG. 9 shows an example of using snapshot buffers to track reserved registers which could potentially still be read by an outstanding instruction.

FIG. 9 shows a method of tracking when the reserved registers in the snapshot buffer 50 can be made available again. At step 150 the reserved register control circuitry 30 determines whether the current value of the issue pointer 64 is ahead of, or equal to, the snapshot pointer 54 of the waiting snapshot buffer 50. This is the case if the issue pointer 64 is greater than the snapshot pointer 54 or if the snapshot pointer 54 is greater than both the issue pointer 64 and the write pointer 60. If the issue pointer 64 trails the snapshot pointer 54, then the method remains at step 150 until the issue pointer 64 catches up with the snapshot pointer 54.

When the issue pointer 64 reaches or passes the address marked by the snapshot pointer 54 for the waiting buffer, this indicates that the oldest instruction remaining in the pipeline is newer than the window of committed instructions for which reserved registers were tracked in the waiting snapshot buffer 50, and so these registers can be released, and also the current window being tracked by the active snapshot buffer 50 can then be closed and a new window can be started. Hence, at step 152 the snapshot pointer 54 for the currently active buffer 50 is set equal to the current value of the commit pointer 62 (to mark the point at which the current window ends). The snapshot pointer 54 for the other buffer 50 may also be invalidated at this point. At step 154 the reserved bits 52 are cleared for all physical registers in the waiting buffer 50. Also, at step 156 the register reserving circuitry 30 switches which of the snapshot buffers 50 is active by switching the state of the active bits 56 of both buffers 50.

Figure 10:
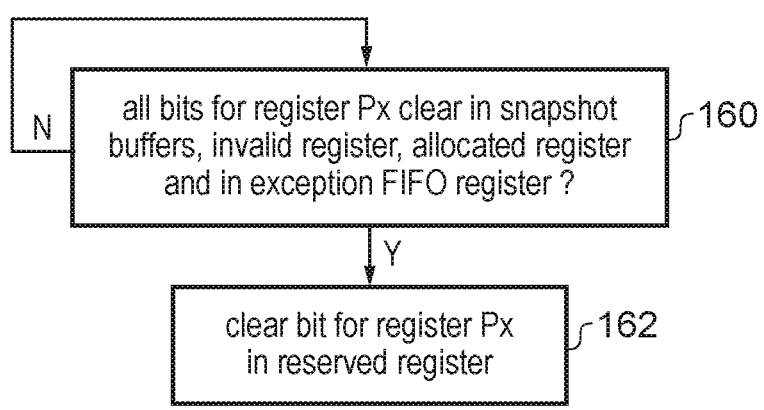
FIG. 10 shows a method of controlling which registers are reserved.

FIG. 10 shows a method of controlling the availability of a register for renaming using the reserved status register 40. At step 160 the register reserving circuitry 30 determines whether, for a given physical register Px, each of the bits corresponding to that register are clear in both snapshot buffers 50, the invalid register 44, the allocated register 46, and the exception FIFO register 48. If so, then at step 162 the corresponding bitfield 42 for register Px is cleared in the reserved status register 40. This ensures that registers with potential pending reads, pending writes, current mappings in the rename table 32 or restoration mappings in the exception FIFO 34 cannot be allocated to a different architectural register, to protect the data value in that register against being overwritten. While the embodiment above uses a certain combination of status registers, it will be appreciated that in other embodiments there could be other conditions when registers need to be protected from renaming and in this case the reserved register 40 can be controlled based on further status registers corresponding to these conditions.

Sometimes, the issue pointer 64 may catch up with the commit pointer 62 or pass ahead of the commit pointer 62 if, by the time a particular instruction has committed, that instruction and any older instructions have already passed out of the issue queue. In this case, both snapshot buffers 50 will end up clear and without a snapshot pointer 54 set. This situation may also arise just after the apparatus 2 is powered up or reset, and the pipeline first starts to process instructions again. In this situation, when instructions start to be committed again then the commit pointer 62 may once more get ahead of the issue pointer 64 and registers may be indicated as reserved in the active snapshot buffer 50 once more. However, as the waiting snapshot buffer 50 may not have the snapshot pointer 54 set, it may be unclear when to halt that window and switch which buffer is active. Therefore, the first window of committed instructions may be closed, and the active buffer switched (by performing steps 152, 154, 156 of FIG. 9) at an arbitrary timing after starting to commit instructions, for example, after a predetermined number of instructions have been committed. For example, the predetermined number may be 1 so that the first time a register is marked as reserved in the active buffer after both buffers become clear, steps 152, 154, 156 of FIG. 9 may be performed to close the first window of committed instructions after just one instruction has been committed. After that, the method can continue as shown in FIG. 9.

Figure 11:
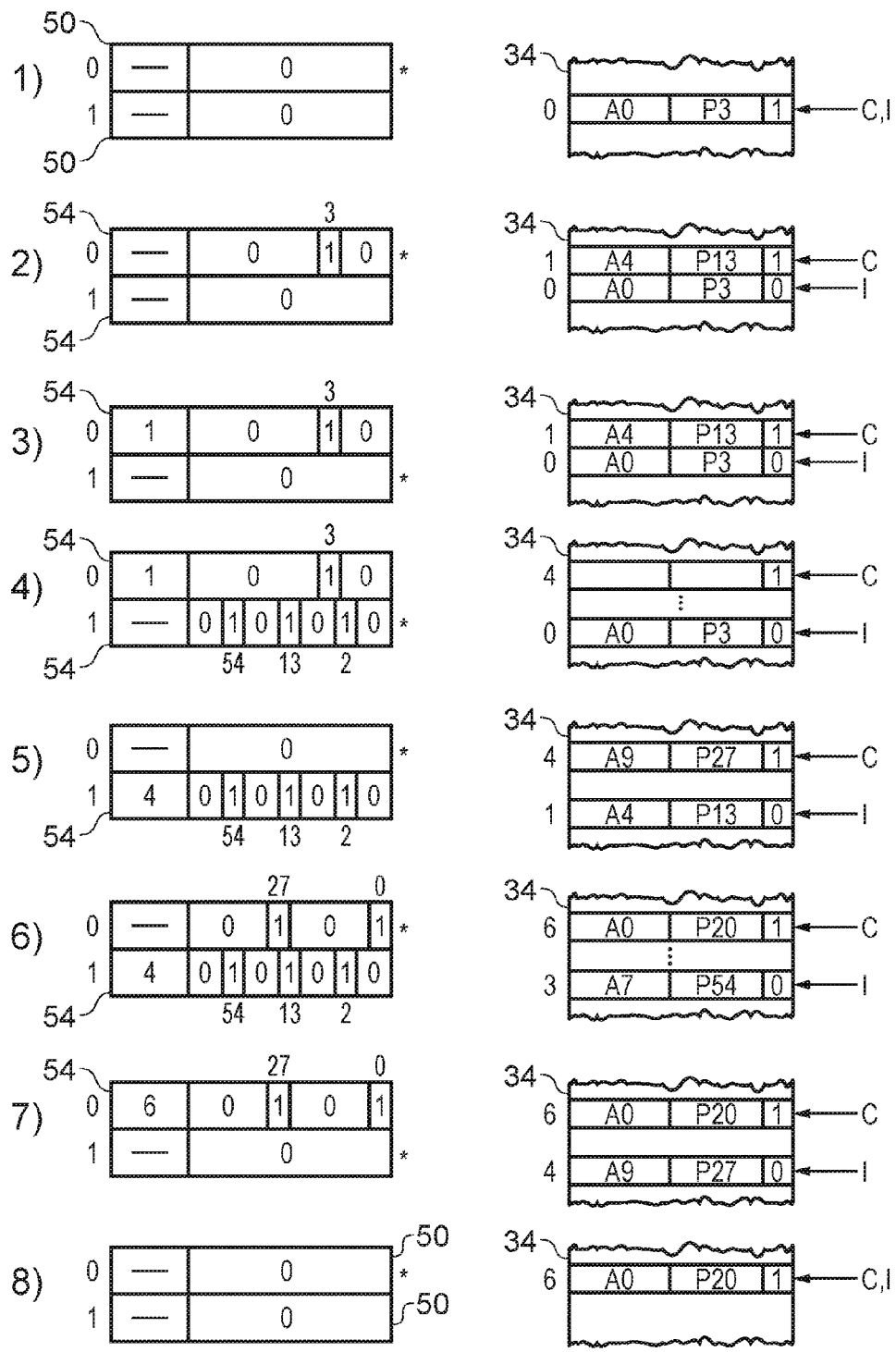
FIG. 11 shows an example of using the snapshot buffers to track reserved registers.

FIG. 11 shows a worked example of tracking reserved registers using the snapshot buffers 50. In each step of FIG. 11, the currently active snapshot buffer 50 is indicated with an asterisk (*) and, for conciseness, only a small portion of the exception FIFO 34 corresponding to the positions of the commit pointer 62 (C) and issue pointer 64 (I) is shown (the write pointer 60 would be ahead of the commit pointer 62).

At step 1 of FIG. 11, the commit pointer C and issue pointer I both point to the same address 0 of the exception FIFO 34 and both snapshot buffers 50 are clear. The restoration entry at address 0 maps architectural register specifier A0 to physical register B3 and this entry is valid. This means that when the corresponding instruction was renamed the existing register mapping for architectural register A0 was to physical register P3 and this was updated based on a new register mapping, so the old physical register P3 was written to the exception FIFO 34.

At step 2 of FIG. 11, the instruction for which the instruction pointer 74 is equal to the commit pointer C=0 is detected as having been committed. Hence, the exception FIFO entry marked by the commit pointer is invalidated, and since the issue pointer I equals the commit pointer C, according to step 144 of FIG. 7 the physical register P3 specified by this entry is marked as reserved in the active snapshot buffer (buffer 0) according to step 148 of FIG. 7. The commit pointer C is incremented so that it now points to the next exception FIFO entry.

As the snapshot pointers 54 for both snapshot buffers are currently invalid, at step 3, the active buffer switching process is performed immediately following the first register being indicated in the active buffer. Hence, the current value of the commit pointer C=1 is written to the snapshot pointer 54 of snapshot buffer 0, buffer 0 becomes the waiting buffer, and buffer 1 becomes the active buffer. Note that the snapshot pointer 54 indicates an address that corresponds to an instruction which is newer than any instruction for which the committed register was indicated in that snapshot buffer 0.

As shown in step 4 of FIG. 11, some more instructions are detected as committed, and the commit pointer has now moved onto address 4 of the exception FIFO. As the issue pointer I lags behind, the active snapshot buffer 1 is updated to mark as reserved the physical registers P2, P13, P54 from the entries at addresses 1, 2, 3 which have been invalidated as the corresponding instructions were committed. The waiting buffer 0 is not updated anymore, and holds onto its existing reserved register indications while waiting for the issue pointer I to catch up with the address marked in the snapshot buffer pointer 54.

At step 5 of FIG. 11, the oldest instruction in the issue queue 10 is issued and the issue pointer now points to address 1 of the exception FIFO 34. Since the issue pointer I now equals the snapshot pointer 54 of the waiting buffer 0, this indicates that the oldest remaining instruction in the issue queue which could still read a register is newer than any of the instructions for which registers were indicated as reserved in the waiting buffer 0, and so these registers can now be released since they can no longer be read. Therefore, the reserved indication for physical register P3 is cleared in the waiting buffer 0, and the snapshot pointer 54 for the waiting buffer 0 is invalidated. The current value of the commit pointer C=4 is set as the snapshot pointer 54 of buffer 1, and then the active buffer is switched again so that buffer 1 becomes waiting and buffer 0 becomes active. Again, note that the value 4 of the snapshot pointer 54 for buffer 1 indicates an address which corresponds to an instruction still to be committed which is newer than any of the committed instructions for which the corresponding restoration registers were marked as reserved in snapshot buffer 1.

Again, as further instructions are committed, some indications of committed registers P0 and P27 are marked in the active snapshot buffer 0, as shown in step 6 of FIG. 11.

As shown in step 7 of FIG. 11, when more instructions are issued, and the issue pointer I reaches address 4, which equals the snapshot pointer 54 of buffer 1, then this indicates that the oldest instruction which could still read a register is newer than any instruction for which a committed register was marked in snapshot buffer 1, so again these registers can be released since there can be no pending read outstanding to these registers. Hence, in step 7 all the indications in buffer 1 are cleared, and snapshot pointer 54 of buffer 0 is set to the current value of the commit pointer C=6, and buffer 1 becomes active and buffer 0 becomes waiting.

This process may continue for some time with the two snapshot buffers alternating as the active buffer and waiting buffer respectively. However, eventually the issue pointer I may catch up with, or pass, the commit pointer C. At this point, both snapshot buffers 50 become clear as shown in step 8 of FIG. 11 because the issue pointer passes the snapshot pointer 54 of the waiting buffer and no further register indications would be added to the active buffer. In this case, the snapshot buffers 50 are back in the state shown in step 1 of FIG. 11, and so when more instructions are committed and the commit pointer C starts to lead the issue pointer again, the process can start again.

Hence, in summary this mechanism can protect registers from being reclaimed for renaming until the point when there cannot be any outstanding read to these registers. By using the exception FIFO 34 and snapshot buffers 50 to deduce when there cannot be outstanding reads left, rather than actually decoding each outstanding register read, the circuit area and leakage overhead associated with reserving registers can be reduced.

While the examples above show that each entry of the exception FIFO corresponds to a single instruction, in some implementations each line of the exception FIFO may store restoration mappings for multiple instructions. In this case, the write pointer 60 may be incremented when the entire exception FIFO line is has been allocated, multiple instructions may share the same instruction pointer 74, and invalidation of a line of the exception FIFO on committing instructions may require each instruction corresponding to that line to have been resolved (either committed or cancelled).

In embodiments where one line of the exception FIFO may indicate multiple restoration mappings for different instructions, then even if the issue pointer 64 equals the commit pointer 62, there could still be an older instruction than the committed instruction pending, since one of the other instructions sharing the same line of the exception FIFO could be older and still pending, and so step 148 of FIG. 7 can be performed both when the commit pointer 62 is ahead of the issue pointer 64 and when the commit pointer 62 equals the issue pointer 64. However, in the case where an exception FIFO entry only contains a restoration mapping for one instruction, then step 148 of FIG. 7 may be omitted in the case when the issue pointer equals the commit pointer, because in this case the oldest instruction in the issue queue is the committed instruction itself, which by definition will not require the physical register specified in the corresponding exception FIFO entry, and so it is not necessary to indicate this register as reserved in step 148. Nevertheless, some embodiments with only one mapping per exception FIFO entry may still perform step 148 even if the commit pointer 62 equals the issue pointer 64.

The above examples have been discussed with reference to instructions processed in the pipeline shown in FIG. 1. However, some systems may also support complex instructions where a single instruction fetched by the fetch stage 4 can be decoded into multiple micro-operations by the decode stage 6 which may each trigger a corresponding operation at the execute stage 12. The method shown above for instructions may also be applied to micro-operations.

Figure 12:
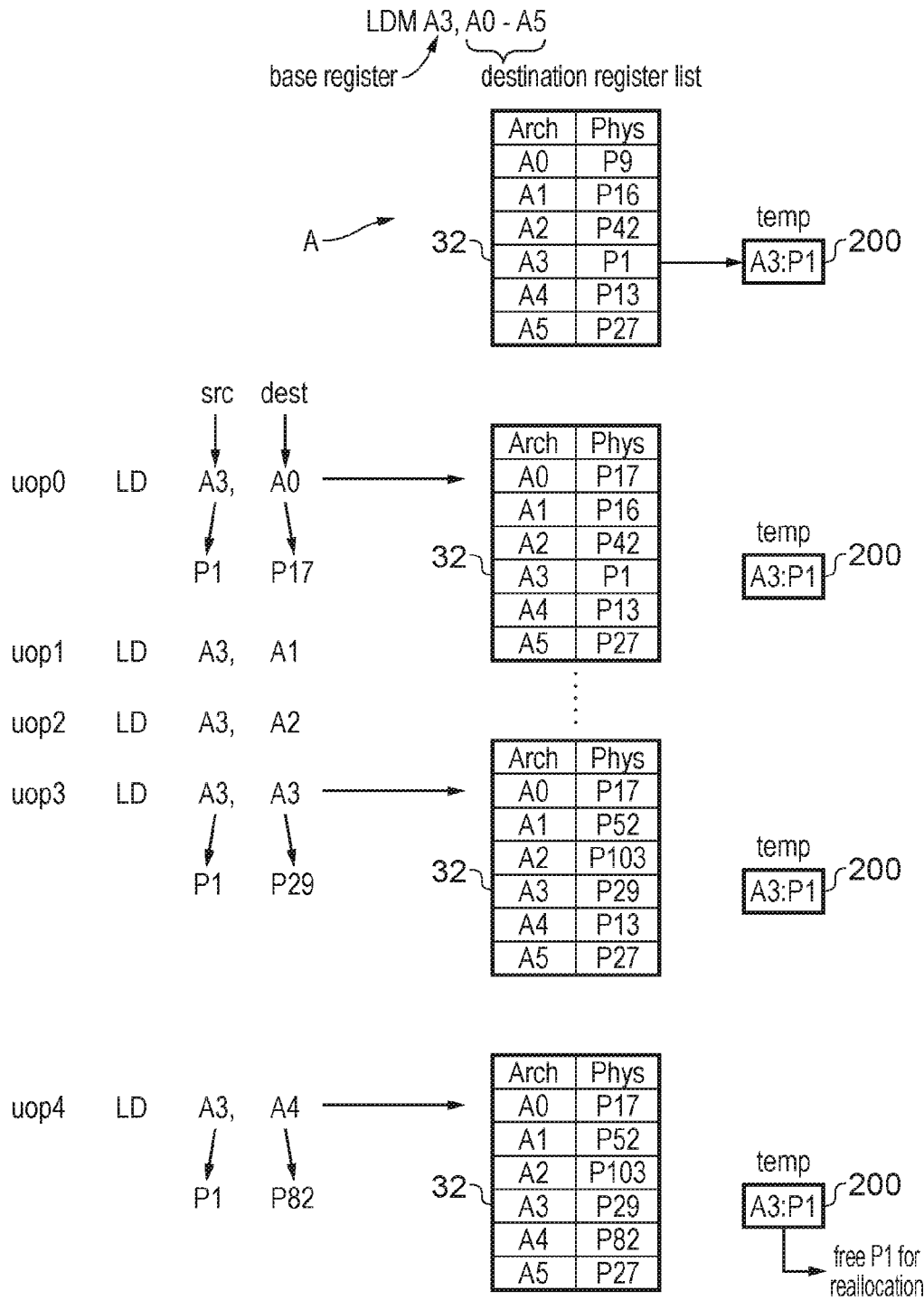
FIG. 12 shows an example of processing a load multiple instruction which specifies the same register as both a source register and destination register.
Figure 12:
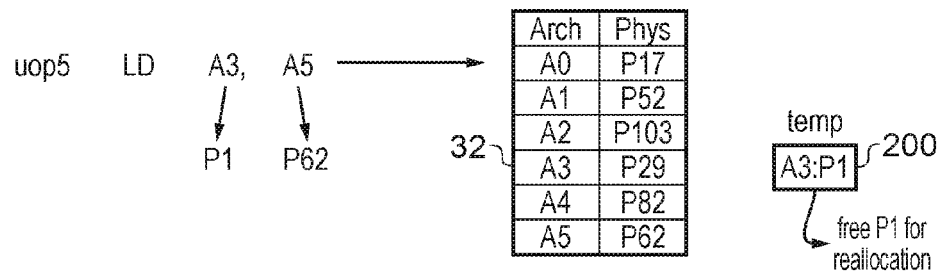

FIG. 12 shows an example of a complex instruction, namely a load multiple instruction which specifies a base register and a list of destination registers. The base register contains a base address which is used to calculate a series of memory addresses from which data values are to be loaded, with each data value being placed in one of the list of destination registers.

As shown in FIG. 12, it may be allowed for the instruction to specify the base register itself within the destination register list. The decode stage 6 may map the load multiple instruction into a number of micro-operations (uops) with each uop performing one of the individual loads to calculate an address based on the base address and load a value from that address into one of the list of destination registers. For example, for the first uop the load address may be the base address itself, and for subsequent uops the load addresses may increase in successive increments so that data values are loaded from a series of memory locations. In the example of FIG. 12, six uops uop0-uop5 are generated, which each specify the base register A3 as a source register and one of the registers A0 to A5 as a destination register. However, uop3 specifies the base register A3 as its destination register, and so would overwrite the base register with the value loaded from memory. This could prevent the subsequent micro-operations uop4-uop6 accessing the correct value for the base address.

FIG. 12 shows a technique for addressing this problem. The register rename stage 8 can maintain an indication of a temporary register mapping for the architectural register specifier A3 which is specified as both the base register and one of the destination registers. When the load multiple instruction is first decoded, the decode stage 6 detects that the instruction specifies the base register in the register list. This information is communicated to the rename stage as shown in FIG. 1. For example the decode stage 6 can provide a control flag 190 indicating whether a complex instruction with the same register as both a source and destination register has been detected, and may also provide an indication of which particular architectural register has been detected as both a source and destination register. When the rename stage 8 detects the control flag 190 provided from the decode stage 6, the rename stage 8 stores to a storage element 200 a temporary mapping of the specified architectural register specifier to the physical register currently specified in the rename table 32 (prior to any new mapping being generated). The storage element 200 could be a temporary entry in the rename table 32 itself, or could be a separate storage element accessible to the rename stage. When one of the micro-operations generated overwrites the base register, the rename table entry for that register is updated as usual, but subsequent uops of the same instruction can substitute the saved temporary mapping for the base register so that this is used instead of the actual updated mapping stored in the rename table 32. This allows the subsequent uops to read the correct value for the base register, which is preserved in the old physical register indicated in the temporary mapping.

Since there can be a long time between the first uop producing the temporary mapping of the base register and the end of the sequence of uops, the physical register P1 mapped in the temporary mapping can be protected from being reclaimed by the register reserving circuitry 30. To do this, the register reserving circuitry 30 may reuse the snapshot mechanism discussed above, setting a bit in the active snapshot buffer 50 for the register indicated in the storage element 200, to prevent the temporary physical register being reclaimed until the micro-operations are complete. Alternatively, another status register similar to registers 44, 46, 48 could be provided with a bit for a given physical register being set when it is indicated in the temporary mapping 200 and cleared when each of the uops of the complex instruction has progressed beyond the point at which this register would be read.

A particular example is described with reference to FIG. 12. As shown in part A of FIG. 12, initially the rename table 32 contains a certain set of register mappings from architectural registers to physical registers. On receiving the control flag from the decode stage 6 and an indication that architectural register A3 is specified as both a source register and a destination register for the load multiple instruction, the rename stage 8 stores to the storage element 200 the temporary mapping from architectural register A3 to physical register P1. For uop0, uop1, uop2, new register mappings are generated for their corresponding destination registers A0, A1 A2 as normal.

For uop3 the destination register is A3 and so a new mapping is generated by the rename stage 8 to overwrite the existing mapping, so A3 is now mapped to a new register P29 instead of P1. However, the old mapping is retained in the storage element 200 and for subsequent micro-operations uop4, uop5 the base register A3 is mapped to the temporary register P1 from the storage element 200 instead of the register P29 indicated in the rename table 32. Once each of the micro-operations is completed, then the storage element 200 can be cleared and register P1 can be freed for reallocation and it can become available for renaming again.

Figure 13:
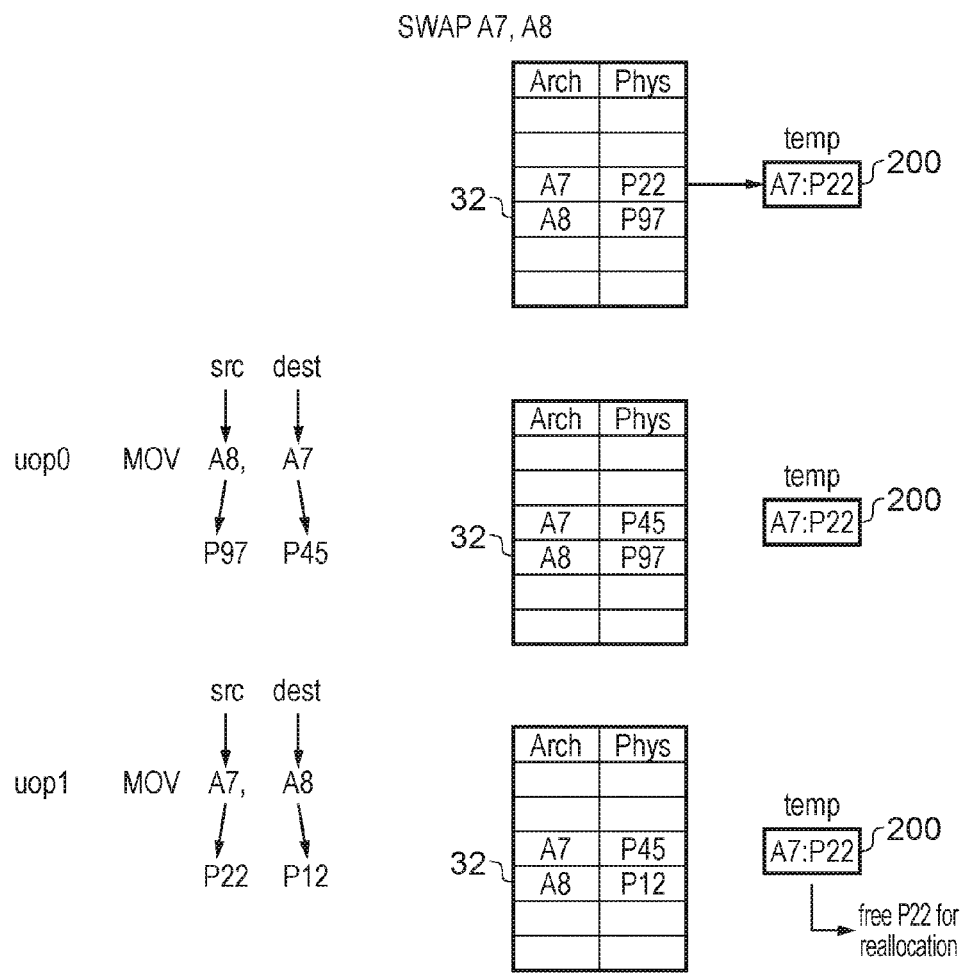
FIG. 13 shows an example of processing a swap instruction.

FIG. 13 shows another example of another complex instruction for which this technique can be used. A swap instruction may trigger the data values in two registers to be swapped, so that each of the registers is updated with a data value from the other register. As shown in FIG. 1 this can be converted into two micro-operations, one to move the data value in a source register A8 to a destination register A7 and a second to move the data value in a source register A7 to a destination register A8. Without the technique discussed above, a further micro-operation would be needed to move the data value in one of these registers to a temporary register prior to executing the two micro-operations actually perform in the move operation. This can be avoided using the technique described above. For example, for uop0 the rename stage 8 may generate a register mapping in the rename table 32 for destination register A7 to map it to a new physical register P45 while the physical register P22 previously mapped to A7 is stored in the temporary mapping 200. For uop1, the register A7 specified as source is mapped to P22 using the temporary mapping from the storage element 200, so that the old value of A7 is used to update register A8 rather than the value which was updated in response to uop0. This avoids the need for an additional uop to move the value in A7 to a temporary location. A similar technique could be applied to instructions which swap the data values in three or more registers.

More generally, this technique can be applied to any complex instruction which is to be decoded into multiple micro-operations and which specifies the same architectural register specifier as both a source register and a destination register.

Figure 14:
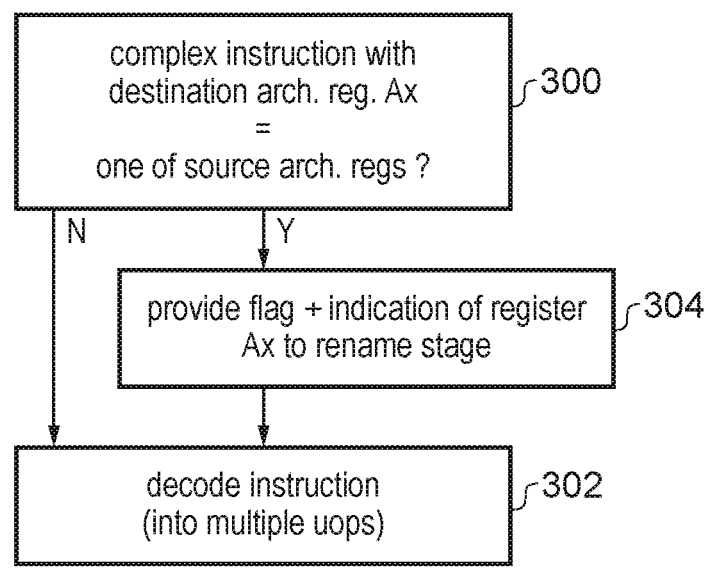
FIG. 14 shows a method of decoding an instruction which specifies the same architectural register as both the source and destination register.
Figure 15:
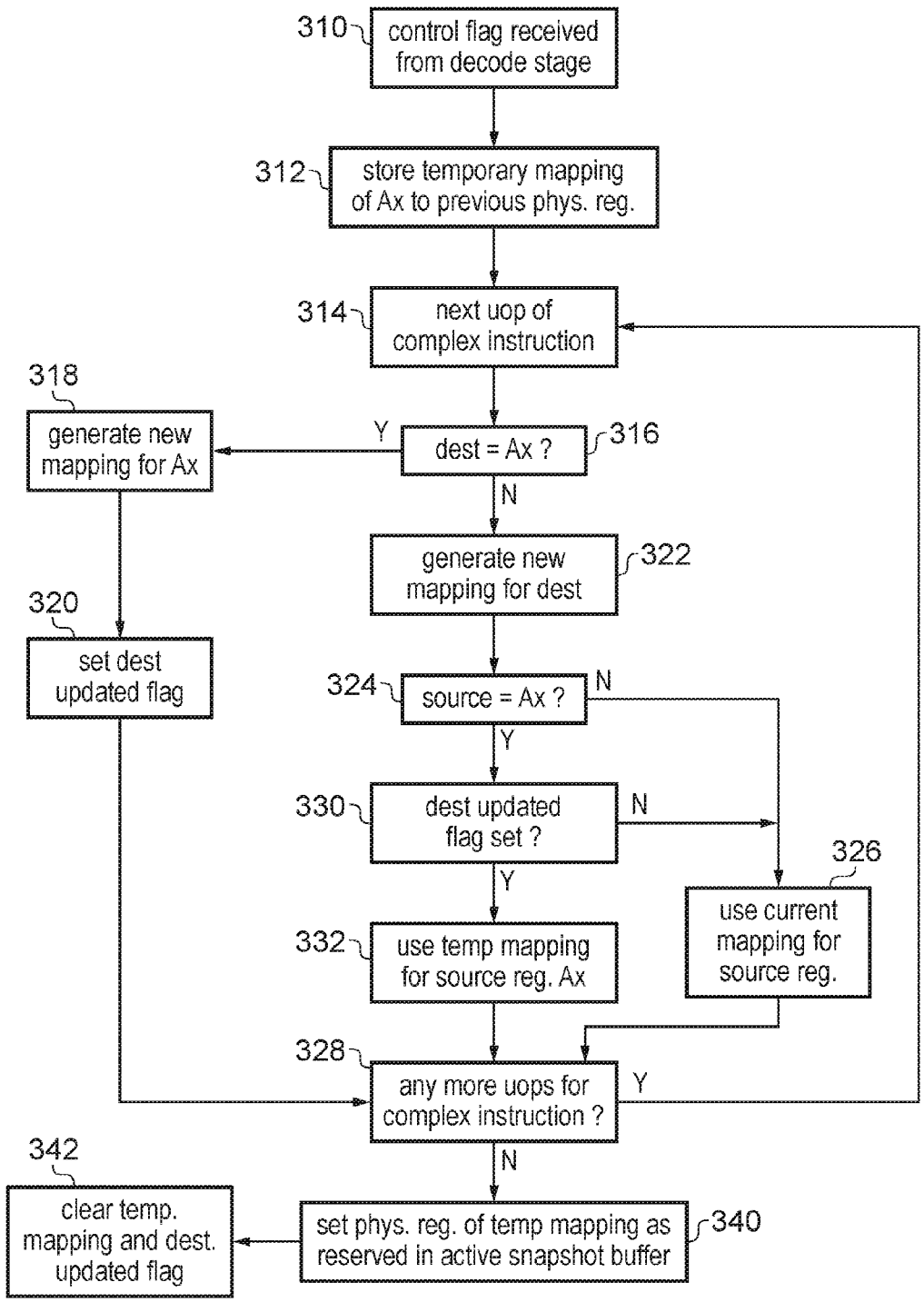
FIG. 15 shows a method of performing renaming for the instruction specifying the same register as both the source and destination register.

FIGS. 14 and 15 show methods of handling such instructions at the decode stage and rename stage 6, 8 respectively. At step 300 of FIG. 14, the decode stage 6 detects whether the current instruction to be decoded is a complex instruction which has a destination architectural register specifier Ax which is the same as one of the source architectural register specifiers. If not, then at step 302 the instructions are decoded in the normal way and the control flag is not provided to the rename stage 8. If the instruction is a complex instruction with the same architectural register specified as both source and destination registers, then at step 304 the control flag is provided to the renaming stage 8 together with an indication of which register Ax is the duplicated register is provided. The instruction is then decoded as normal at step 302.

FIG. 15 shows method of renaming micro-operations at the rename stage when the control flag 190 is set. At step 310 of FIG. 15 the control flag 190 is received from the decode stage 6 to indicate that the following micro-operations are micro-operations to be subject to the particular renaming techniques shown in the rest of FIG. 15. At step 312 the rename stage 8 stores to the temporary storage element 200 the indication of the physical register which is currently mapped to architectural register Ax as indicated by the decode stage 6. At step 314 the rename stage selects the next micro-operation of the complex instruction. At step 316 it is determined whether the destination register for that micro-operation is architectural register Ax. If so then at step 318 a new register mapping is generated for architectural register specifier Ax and the corresponding physical register is updated in the rename table 32. This can be done in accordance with the method shown in FIG. 4. At step 320, a destination updated flag is set. The method then proceeds to step 328 where it is checked whether there are any more uops to be processed for the current complex instruction, and if so the method returns to step 314 to select the next uop. For example, the decode stage may append a bit to the last micro-operation of the complex instruction to enable the rename stage to detect which micro-operation is the last one.

On the other hand, if at step 316 it is determined that the destination register for the current uop is not Ax, then at step 322 the rename stage generates a new register mapping for the destination register. The rename stage 8 updates the rename table 32 accordingly. At step 324 it is determined whether the source register for this micro-operation is Ax. If not then at step 326 the rename stage 8 uses the current mapping indicated for the source register in the rename table 32 to map the architectural register specifier to a physical register specifier and provides the renamed uop to the issue queue 10. At step 328 it is determined whether there are any more micro-operations for the current complex instruction and if so then the method returns to step 314 to select the next micro-operation.

On the other hand, if at step 324 it was determined that the source register for the current micro-operation is register Ax, then at step 330 it is checked whether the destination updated flag is set. If not, then again the current mapping for the source register of this micro-operation is used at step 326 and the method again proceeds to step 328.

However, if the source register of the current micro-operation is register Ax and at step 330 it is determined that the destination updated flag is set, then at step 332 the rename stage 8 uses the temporary mapping for source register Ax which is indicated in the storage element 200. Hence the source register Ax will be mapped to the physical register indicated in the storage element 200 instead of the physical register indicated in the corresponding entry of the rename table 32. Again, the method proceeds to step 328 to check whether there are any more uops to be processed.

Eventually, there are no further uops to rename, and so the method proceeds from step 328 to step 340, where the physical register indicated in the storage element 200 is marked as reserved in the active snapshot buffer 50 to protect it from being reallocated. At step 342 the temporary mapping is then cleared from the storage element 200 and the destination updated flag can also be cleared.

The use of the destination updated flag shown in FIG. 15 is optional. If it is not provided then following step 324 if the source register is the specified architectural register Ax then the temporary mapping could be used regardless of whether an earlier uop has already updated the register mapping for register Ax, since this will still give the correct result.

By following the methods shown in FIGS. 14 and 15, instructions which decode to multiple micro-operations and specify a source register as one a destination register can be handled more efficiently. This can be applied to other types of instructions, not just the load multiple and swap instructions shown above.

In the present application, the words "configured to ..." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

The following clauses define possible example arrangements:

1. An apparatus comprising:
    decoding circuitry to decode instructions to generate micro-operations for controlling processing circuitry to perform data processing; and
    register rename circuitry to map architectural register specifiers specified by the instructions to physical registers to be accessed in response to the micro-operations; wherein:
    in response to an instruction specifying a selected architectural register specifier as both a source register and a destination register, for which the decoding circuitry is to generate a plurality of micro-operations, the register rename circuitry is configured to store to a storage element an indication of a physical register previously mapped to said selected architectural register specifier; and
    in response to one of said plurality of micro-operations for which the source register corresponds to the selected architectural register specifier and which follows one of said plurality of micro-operations for which the destination register corresponds to the selected architectural register specifier, the register rename circuitry is configured to map the selected architectural register specifier to the physical register indicated in said storage element.

2. The apparatus according to clause 1, wherein the decoding circuitry is configured to provide a control indication to the register rename circuitry when the decoding circuitry detects that the instruction specifies the same architectural register specifier as both the source register and the destination register.

3. The apparatus according to clause 2, wherein in response to the control indication, the register rename circuitry is configured to store to the storage element the indication of the physical register previously mapped to the selected architectural register specifier.

4. The apparatus according to any of clauses 1 to 3, comprising a rename table to store one or more rename entries defining current register mappings between architectural register specifiers and physical registers.

5. The apparatus according to clause 4, wherein the storage element comprises the rename table and said indication of the physical register comprises a temporary entry of the rename table mapping the selected architectural register specifier to the physical register previously mapped to the selected architectural register specifier.

6. The apparatus according to any of clauses 1 to 5, wherein in response to a first one of said plurality of micro-operations for which the destination register corresponds to said selected architectural register specifier, the register rename circuitry is configured to generate a new mapping between said selected architectural register specifier and a further physical register different to said physical register previously mapped to said selected architectural register specifier.

7. The apparatus according to clause 6, wherein the register rename circuitry is configured to map the selected architectural register specifier to said physical register indicated in the storage element for any of the plurality of micro-operations which follow said first one of said plurality of micro-operations and for which the source register corresponds to the selected architectural register specifier.

8. The apparatus according to any of clauses 1 to 7, comprising register reserving circuitry to indicate one or more reserved physical registers which are prevented from being remapped to a different architectural register specifier by the register rename circuitry.

9. The apparatus according to clause 8, wherein the register reserving circuitry is configured to indicate said physical register previously mapped to the selected architectural register specifier as one of the reserved physical registers at least until register reads are complete for each of the plurality of micro-operations.

10. The apparatus according to any of clauses 1 to 9, wherein said instruction comprises a load multiple instruction specifying a base register and a plurality of destination registers to be written with data values accessed using addresses determined using a base address stored in the base register, for which the plurality of destination registers includes the base register.

11. The apparatus according to any of clauses 1 to 10, wherein said instruction comprises a swap instruction specifying two or more registers for which each of the two or more registers is to be updated with a data value stored in another of the two or more registers.

12. An apparatus comprising:
   means for decoding instructions to generate micro-operations for controlling processing circuitry to perform data processing; and
   means for mapping architectural register specifiers specified by the instructions to physical registers to be accessed in response to the micro-operations; wherein:
   in response to an instruction specifying a selected architectural register specifier as both a source register and a destination register, for which the means for decoding is to generate a plurality of micro-operations, the means for mapping is configured to store to a storage element an indication of a physical register previously mapped to said selected architectural register specifier; and
   in response to one of said plurality of micro-operations for which the source register corresponds to the selected architectural register specifier and which follows one of said plurality of micro-operations for which the destination register corresponds to the selected architectural register specifier, the means for mapping is configured to map the selected architectural register specifier to the physical register indicated in said storage element.

13. A method comprising:
   decoding instructions to generate micro-operations for controlling processing circuitry to perform data processing; and
   mapping architectural register specifiers specified by the instructions to physical registers to be accessed in response to the micro-operations; and
   in response to an instruction specifying a selected architectural register specifier as both a source register and a destination register, for which the decoding step generates a plurality of micro-operations, storing to a storage element an indication of a physical register previously mapped to said selected architectural register specifier; and
   in response to one of said plurality of micro-operations for which the source register corresponds to the selected architectural register specifier and which follows one of said plurality of micro-operations for which the destination register corresponds to the selected architectural register specifier, mapping the selected architectural register specifier to the physical register indicated in said storage element.

Although illustrative embodiments have been described in de ail herein with reference to the accompanying drawings, it is to be understood that the invention is not limited to those precise embodiments, and that various changes and modifications can be effected therein by one skilled in the art without departing from the scope of the appended claims.

We claim:
1. An apparatus comprising:
   register rename circuitry to map architectural register specifiers specified by instructions to physical register specifiers identifying physical registers to be accessed in response to the instructions;
   a restoration table to identify at least one restoration mapping between an architectural register specifier specified by a corresponding speculative instruction and a physical register specifier previously mapped to that architectural register specifier; and
   register reserving circuitry to indicate one or more reserved physical register specifiers which are prevented from being remapped to a different architectural register specifier by the register rename circuitry;
   wherein:
   in response to detecting that the speculative instruction corresponding to a restoration mapping of the restoration table has been committed when the speculative instruction or at least one older instruction still has the potential to trigger a read of a physical register, the register reserving circuitry is configured to indicate the physical register specifier specified by that restoration mapping as a reserved physical register specifier;
   the register reserving circuitry comprises a plurality of snapshot buffers each configured to indicate one or more reserved physical register specifiers;
   the snapshot buffers comprise an active snapshot buffer and at least one waiting snapshot buffer;
   each waiting snapshot buffer is associated with a snapshot pointer, and a given snapshot pointer associated with a given waiting snapshot buffer is indicative of a last committed speculative instruction for which a physical register specifier was indicated as a reserved physical register specifier in the given waiting snapshot buffer; and
   in response to a determination that the oldest instruction having the potential to trigger a read to a physical register is newer than the last committed speculative instruction indicated by the given snapshot pointer for the given waiting snapshot buffer, the register reserving circuitry is configured to switch which of the plurality of snapshot buffers is the active snapshot buffer.

2. The apparatus according to claim 1, wherein the register reserving circuitry is configured to indicate physical register specifiers specified in the restoration table as reserved physical register specifiers.

3. The apparatus according to claim 1, wherein the restoration table is configured to invalidate a given one of said at least one restoration mapping corresponding to a speculative instruction in response to the speculative instruction being committed.

4. The apparatus according to claim 1, wherein each snapshot buffer is configured to indicate one or more reserved physical register specifiers for a corresponding window of committed speculative instructions; and in response to an indication that the oldest instruction having the potential to trigger a read of a physical register is newer than the window of committed speculative instructions corresponding to one of said snapshot buffers, the register reserving circuitry is configured to clear indications of reserved physical register specifiers in said one of said snapshot buffers.

5. The apparatus according to claim 1, wherein in response to detecting that the speculative instruction corresponding to a restoration mapping of the restoration table has been committed when the speculative instruction or at least one older instruction still has the potential to trigger a read of a physical register, the register reserving circuitry is configured to update the active snapshot buffer to indicate that the physical register specifier specified by that restoration mapping is a reserved physical register specifier.

6. The apparatus according to claim 1, wherein in response to a determination that the oldest instruction having the potential to trigger a read to a physical register is newer than the last committed speculative instruction indicated by the given snapshot pointer for the given waiting snapshot buffer, the register reserving circuitry is configured to clear one or more indications of reserved physical register specifiers in said given waiting snapshot buffer.

7. An apparatus comprising:

register rename circuitry to map architectural register specifiers specified by instructions to physical register specifiers identifying physical registers to be accessed in response to the instructions;

a restoration table to identify at least one restoration mapping between an architectural register specifier specified by a corresponding speculative instruction and a physical register specifier previously mapped to that architectural register specifier; and register reserving circuitry to indicate one or more reserved physical register specifiers which are prevented from being remapped to a different architectural register specifier by the register rename circuitry;

wherein:

in response to detecting that the speculative instruction corresponding to a restoration mapping of the restoration table has been committed when the speculative instruction or at least one older instruction still has the potential to trigger a read of a physical register, the register reserving circuitry is configured to indicate the physical register specifier specified by that restoration mapping as a reserved physical register specifier;

the register reserving circuitry comprises a plurality of snapshot buffers each configured to indicate one or more reserved physical register specifiers;

the snapshot buffers comprise an active snapshot buffer and at least one waiting snapshot buffer;

each waiting snapshot buffer is associated with a snapshot pointer, and a given snapshot pointer associated with a given waiting snapshot buffer is indicative of a last committed speculative instruction for which a physical register specifier was indicated as a reserved physical register specifier in the given waiting snapshot buffer; and comprising a register reading unit configured to read a value from a physical register in response to at least some instructions;

wherein the register reading unit is configured to provide an oldest instruction indication indicative of the oldest instruction pending in the register reading unit; and the register reserving circuitry is configured to determine whether the oldest instruction having the potential to trigger a read to a physical register is newer than said last committed speculative instruction based on a comparison of said oldest instruction indication and said given snapshot pointer.

8. The apparatus according to claim 1, wherein the speculative instruction comprises one of:

a branch instruction;

a conditional instruction;

a load/store instruction; and an instruction following another speculative instruction.

9. The apparatus according to claim 1, comprising a rename table configured to identify at least one current mapping between an architectural register specifier specified by an instruction and a physical register specifier currently mapped to the architectural register specifier, wherein in response to cancelling of execution of the speculative instruction corresponding to a restoration mapping of the restoration table, the register rename circuitry is configured to update the rename table based on the restoration mapping for the speculative instruction in the restoration table.

10. A method comprising:

mapping architectural register specifiers specified by instructions to physical register specifiers identifying physical registers to be accessed in response to the instructions;

identifying at least one restoration mapping between an architectural register specifier specified by a corresponding speculative instruction and a physical register specifier previously mapped to that architectural register specifier;

indicating one or more reserved physical register specifiers which are prevented from being remapped to a different architectural register specifier by the register rename circuitry; and in response to detecting that the speculative instruction corresponding to a restoration mapping has been committed when the speculative instruction or at least one older instruction still has the potential to trigger a read of a physical register, indicating the physical register specifier specified by that restoration mapping as a reserved physical register specifier; wherein:

a plurality of snapshot buffers are provided, each to indicate one or more reserved physical register specifiers;

the snapshot buffers comprise an active snapshot buffer and at least one waiting snapshot buffer;

each waiting snapshot buffer is associated with a snapshot pointer, and a given snapshot pointer associated with a given waiting snapshot buffer is indicative of a last committed speculative instruction for which a physical register specifier was indicated as a reserved physical register specifier in the given waiting snapshot buffer; and the method comprises, in response to a determination that the oldest instruction having the potential to trigger a read to a physical register is newer than the last committed speculative instruction indicated by the given snapshot pointer for the given waiting snapshot buffer, switching which of the plurality of snapshot buffers is the active snapshot buffer.

* * * * *